(12) United States Patent
Yoshida

(10) Patent No.: US 7,937,668 B2
(45) Date of Patent: May 3, 2011

(54) INFORMATION PROCESSING APPARATUS AND DISPLAY METHOD

(75) Inventor: Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 12/059,581

(22) Filed: Mar. 31, 2008

(65) Prior Publication Data

US 2008/0250344 A1 Oct. 9, 2008

(30) Foreign Application Priority Data

Apr. 4, 2007 (JP) .................................. 2007-098639

(51) Int. Cl.
*G06F 19/00* (2006.01)
*G06K 9/46* (2006.01)
(52) U.S. Cl. ........................................ 715/782; 715/849
(58) Field of Classification Search .................. 715/852, 715/848–851, 821–824, 765–767, 744–747, 715/757, 782; 345/650–657, 473–475; 219/121.73; 382/282, 164
See application file for complete search history.

(56) References Cited

U.S. PATENT DOCUMENTS

| | | | | |
|---|---|---|---|---|
| 5,678,015 A * | 10/1997 | Goh | | 715/782 |
| 6,043,818 A * | 3/2000 | Nakano et al. | | 715/851 |
| 6,781,610 B2 * | 8/2004 | Os et al. | | 715/764 |
| 6,972,757 B2 * | 12/2005 | Arikawa et al. | | 345/419 |
| 7,058,896 B2 * | 6/2006 | Hughes | | 715/757 |
| 7,281,229 B1 * | 10/2007 | Jayapalan | | 716/119 |
| 7,362,331 B2 * | 4/2008 | Ording | | 345/473 |
| 7,437,684 B2 * | 10/2008 | Maille et al. | | 715/852 |
| 2002/0085041 A1 * | 7/2002 | Ishikawa | | 345/804 |
| 2008/0079723 A1 * | 4/2008 | Hanson et al. | | 345/427 |
| 2008/0247635 A1 * | 10/2008 | Davis et al. | | 382/152 |
| 2008/0247636 A1 * | 10/2008 | Davis et al. | | 382/152 |

FOREIGN PATENT DOCUMENTS

JP 2000-322172 A 11/2000

* cited by examiner

*Primary Examiner* — Steven P Sax
(74) *Attorney, Agent, or Firm* — Canon USA, Inc. IP Division

(57) ABSTRACT

An information processing apparatus displays a window in a two-dimensional or three-dimensional manner on a display screen of a display device. When a starting of an annotation operation on a window displayed in a three-dimensional manner is detected, the window is rotated about a rotational axis intersecting an origin at which the annotation input has started on the window so as to display the window in a two-dimensional manner, and a result of the annotation operation is reflected in the window.

9 Claims, 26 Drawing Sheets

INFORMATION PROCESSING APPARATUS AND DISPLAY METHOD

BACKGROUND OF THE INVENTION

1. Field of the Invention

The present invention relates to an information processing apparatus and a display method.

2. Description of the Related Art

Regarding a display method of the related art, in Japanese Patent Laid-Open No. 2000-322172, a display method for displaying a window in a two-dimensional or three-dimensional manner in order to efficiently arrange windows on a display screen has been disclosed. If such a display method of the related art is used, a large number of windows may be efficiently arranged on a display screen of limited area, and a user may psychologically feel that the screen is wide. Furthermore, the example of the related art makes it possible to change the display of windows from a two-dimensional display to a three-dimensional display and conversely, also makes it possible to return from the three-dimensional display to the two-dimensional display.

The changing of the window display from two dimensions to three dimensions is performed as follows:

1. In response to a user operating a frame part of a two-dimensionally displayed window, the window is rotated, with a frame part on the opposite side serving as a rotational axis, or
2. The window is rotated with the center of the two-dimensionally displayed window serving as a rotational axis.

On the other hand, the changing of the window display from three dimensions to two dimensions is performed as a result of the position of the three-dimensionally displayed window being changed to the original position of the two-dimensionally displayed window.

In the related art, when the display of a window is changed from being displayed in a three-dimensional manner to being displayed in a two-dimensional manner in response to an annotation operation on a three-dimensionally displayed window by a user, the window is rotated, with the rotational axis of the window being the frame part (end) of the window or being the center of the window. For this reason, the place at which the annotation input has started on the three-dimensionally displayed window differs from the place at which the window rotates and a two-dimensional display is formed, and a problem arises in that the annotation operation cannot be performed at an intended position.

SUMMARY OF THE INVENTION

An embodiment of the present invention is directed to displaying a window in a two-dimensional or three-dimensional manner on a display screen and enabling an annotation operation to be performed at a position intended by a user.

According to an aspect of the present invention, an information processing apparatus capable of displaying a window in a two-dimensional or three-dimensional manner on a display screen of a display device includes a display unit configured to display the window in a two-dimensional or three-dimensional manner on the display screen; and a detection unit configured to detect a starting of an input operation with respect to a window displayed on the display screen, wherein, when the detection unit detects a starting of an annotation input on a window displayed in a three-dimensional manner, the display unit displays the window in a two-dimensional manner by rotating the window about a rotational axis intersecting an origin at which the annotation input has started on the window, and a result of the annotation input is reflected in the window displayed in a two-dimensional manner.

Embodiments of the present invention may be embodied in a form of a display method, a program, and a storage medium.

According to an embodiment of the present invention, it is possible to perform an annotation operation at a position intended by a user.

Further features of the present invention will become apparent from the following description of exemplary embodiments with reference to the attached drawings.

BRIEF DESCRIPTION OF THE DRAWINGS

The accompanying drawings which are incorporated in and constitute a part of the specification illustrate embodiments of the invention and together with the description serve to explain the principles of the invention.

DESCRIPTION OF THE EMBODIMENTS

Preferred embodiments of the present invention will be described in detail below with reference to the drawings.

First Embodiment

Figure 1:
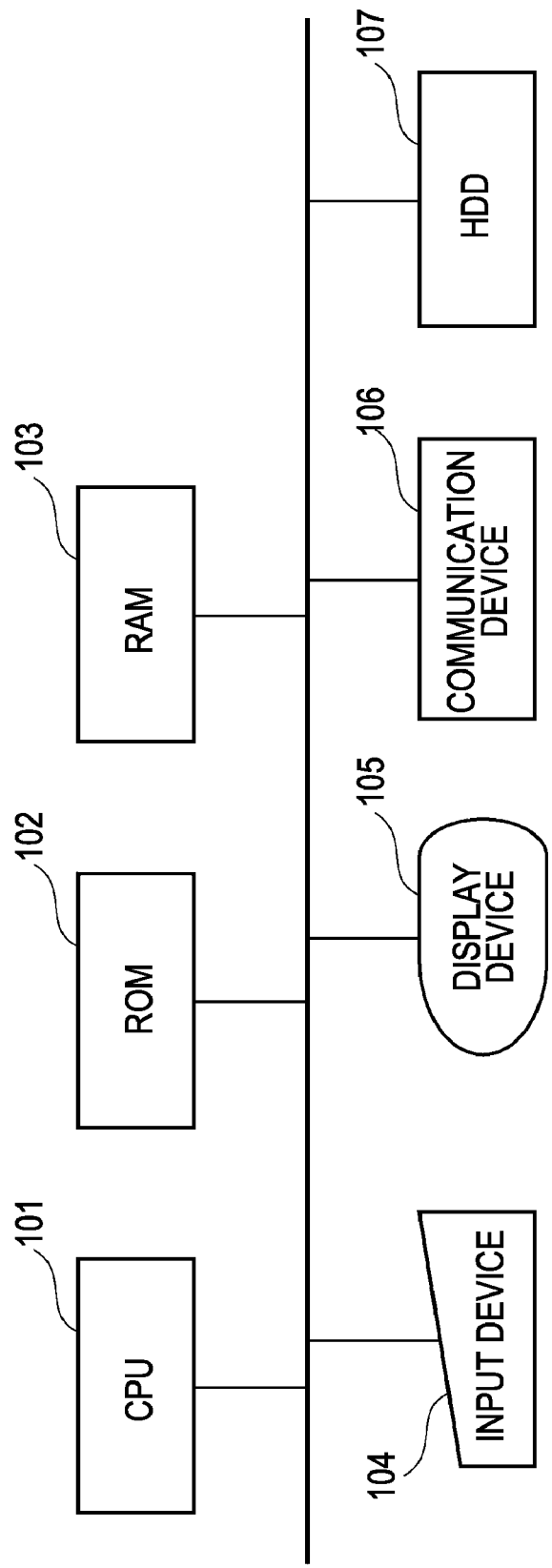
FIG. 1 shows an example of the hardware configuration of a PC, which is an example of an information processing apparatus (or a computer).

FIG. 1 shows an example of a hardware configuration of a PC, which is an example of an information processing apparatus (or a computer). As shown in FIG. 1, the PC includes, as a hardware configuration, a CPU 101, a ROM 102, a RAM 103, an input device 104, a display device 105, a communication device 106, and an HDD 107.

The CPU 101 controls various components of the PC. The ROM 102 is a read-only memory, in which a program to be read first when the power supply is switched on, the program being executed by the CPU 101, and the like are stored. The RAM 103 is used as a work area via which the CPU 101 executes a program. The input device 104 receives various kinds of data and commands. Examples of the input device 104 include a mouse, a keyboard, a stylus pen (pen), and an optical digitizer.

The display device 105 displays various kinds of data, windows, or the like, and displays a cursor in correspondence with the operation of the input device 104. The communication device 106 obtains data from an external terminal.

The HDD 107 is used as an area for storing various kinds of data used to display windows, information attached to windows by an annotation operation, and the like. Furthermore, in the HDD 107, an application program related to display control of windows, or the like, shown below, has been stored in advance. Annotation refers to information added (or drawn) with characters, figures or the like to a window. Furthermore, an annotation operation refers to inputting (or adding, drawing) annotation and displaying it.

The CPU 101 reads an application program stored in the HDD 107 onto the RAM 103, and performs processing on the basis of the application program, thereby realizing functions related to the display control of windows (to be described later), or a flowchart.

Figure 2:
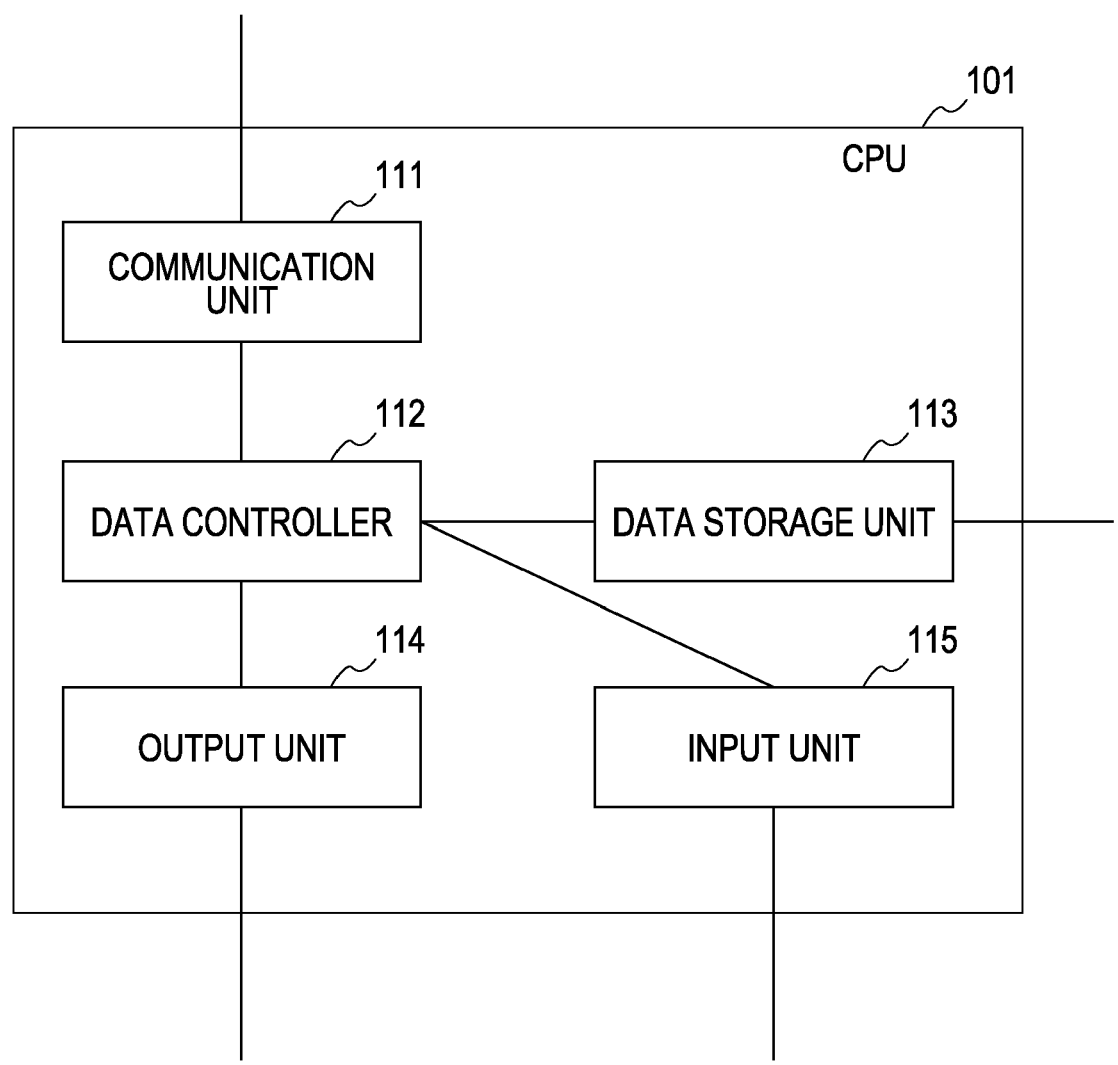
FIG. 2 shows an example of the functional configuration of a PC.

FIG. 2 shows an example of the functional configuration of the PC. As shown in FIG. 2, the PC includes, as a functional configuration, a communication unit 111, a data controller 112, a data storage unit 113, an output unit 114, and an input unit 115.

The communication unit 111 performs an information communication control process for transmitting or receiving information to or from another information processing apparatus (another PC) via the communication device 106. The data controller 112 controls processing for outputting display screen information and image information (window display control process). The data storage unit 113 stores display screen information in the data controller 112 and information used in a process for outputting image information in the RAM 103 or in the HDD 107, and obtains information from the RAM 103, the HDD 107, and the like.

The output unit 114 performs a process for outputting display screen information to the display device 105, such as a liquid-crystal display or a rear projection display, under the control of the data controller 112. The input unit 115 receives input information input by the input device 104, such as a keyboard, a mouse, a pen, and an optical digitizer, and transfers the information to the data controller 112.

Figure 3:
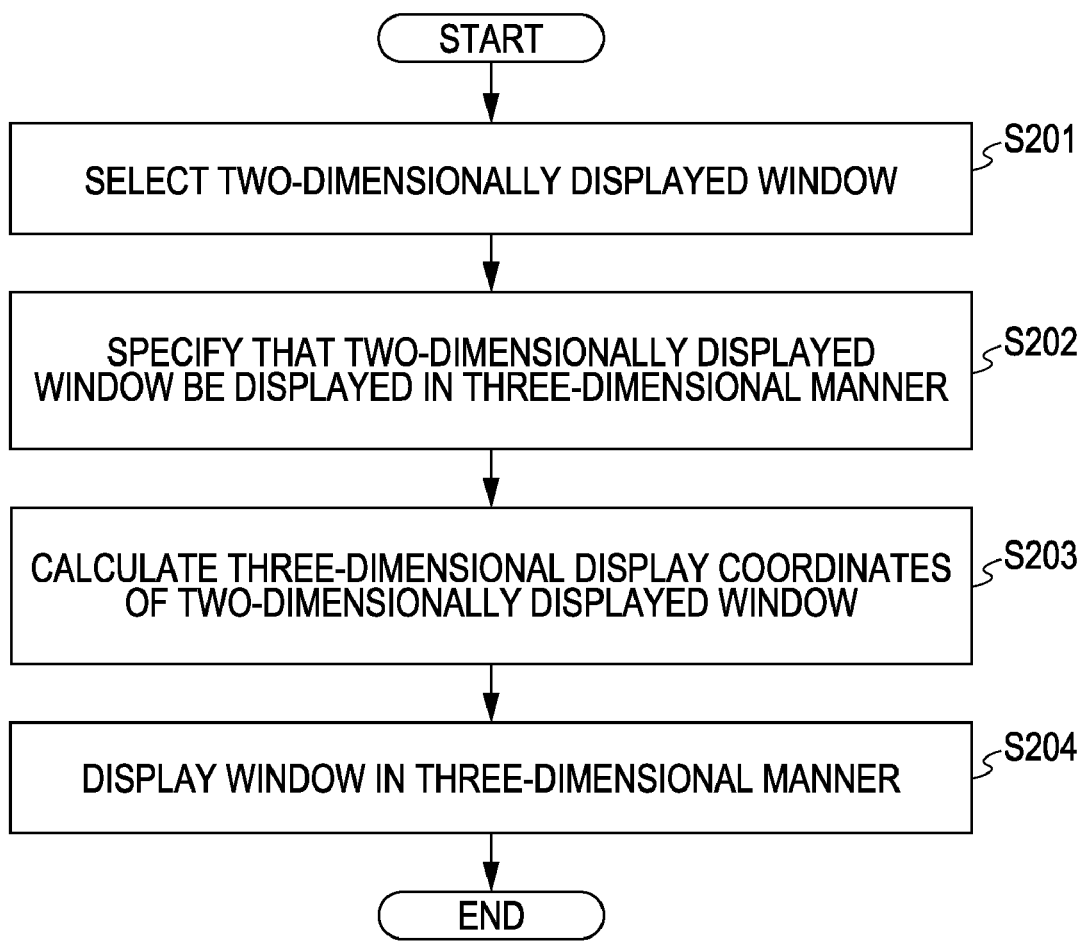
FIG. 3 is a flowchart illustrating an example of a process for changing the display of windows on the display screen of a display device 105 in the PC according to a first embodiment of the present invention from a two-dimensional display to a three-dimensional display.

Next, referring to FIG. 3, a description will be given of the flow of operation for changing the display of windows on a display screen from a two-dimensional display to a three-dimensional display in the PC according to the first embodiment of the present invention. FIG. 3 is a flowchart illustrating an example of a process for changing the display of windows on the display screen of the display device 105 from a two-dimensional display to a three-dimensional display in the PC according to the first embodiment of the present invention.

Figure 4:
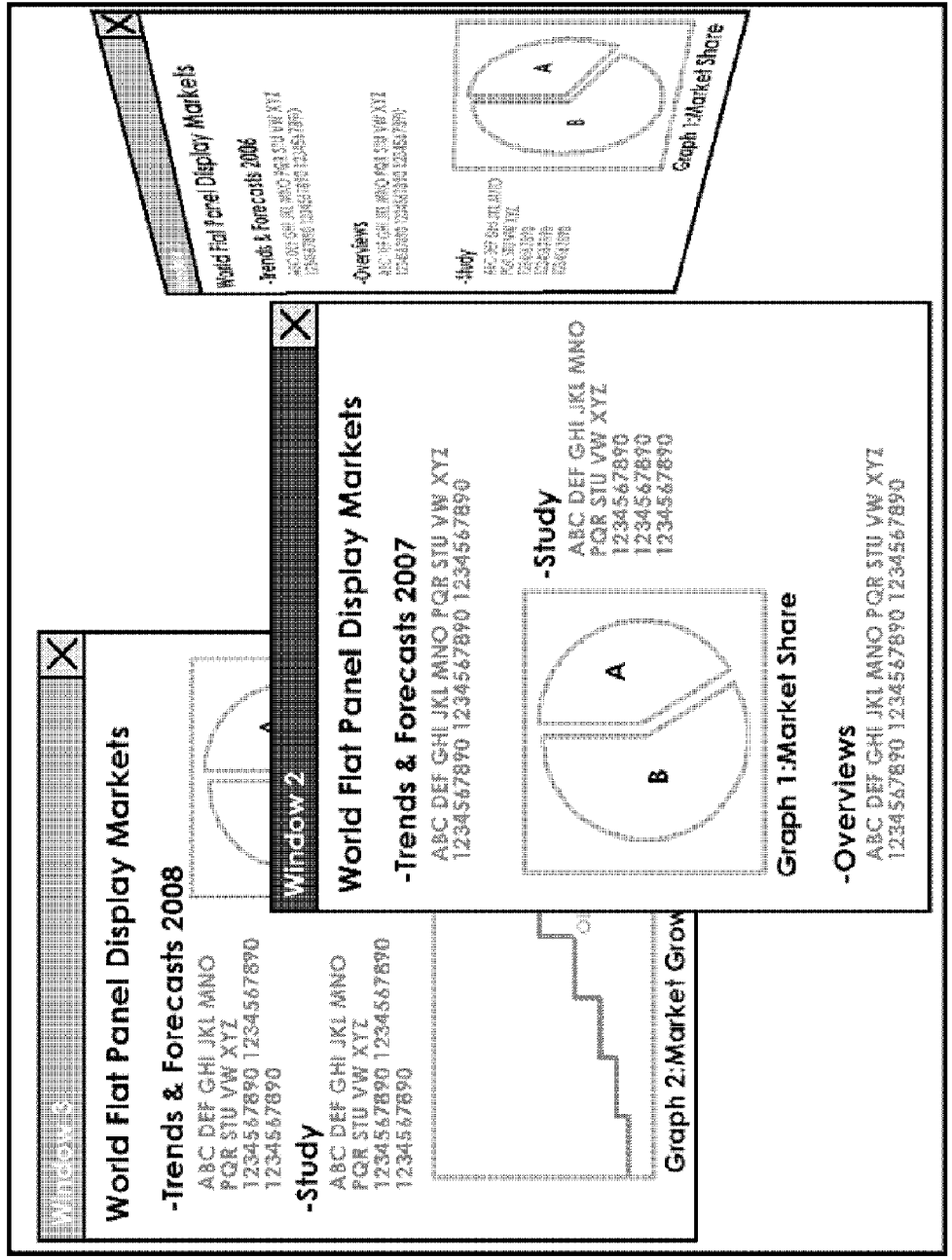
FIG. 4 shows an example of a display screen when the flowchart shown in FIG. 3 begins in the PC according to the first embodiment of the present invention.

When the process in FIG. 3 begins, suppose that the data controller 112 has already displayed three windows on the display screen of the display device 105 via the output unit 114, as shown in FIG. 4. A window "Window 1" among the windows is displayed in a three-dimensional manner. Furthermore, the data controller 112 has displayed windows "Window 2" and "Window 3" in a two-dimensional manner. Here, FIG. 4 shows an example of a display screen when the flowchart shown in FIG. 3 begins in the PC according to the first embodiment of the present invention.

In step S201, the data controller 112 detects via the input unit 115 that a user has selected the window "Window 3".

Next, in step S202, the data controller 112 detects via the input unit 115 that the user has specified that the display of the window "Window 3" be changed from being a two-dimensional display to being a three-dimensional display.

Next, in step S203, the data controller 112 calculates the display coordinates of the window "Window 3" in a three-dimensional display. In the first embodiment, the data controller 112 calculates the display coordinates in the three-dimensional display on the basis of the following rules. These rules are stored in the HDD 107.

The rotational angle when changing from a two-dimensional display to a three-dimensional display is constant for the entire screen.

The rotational axis when changing from a two-dimensional display to a three-dimensional display is a vertical axis that passes through the center of the window on the display screen.

Figure 5:
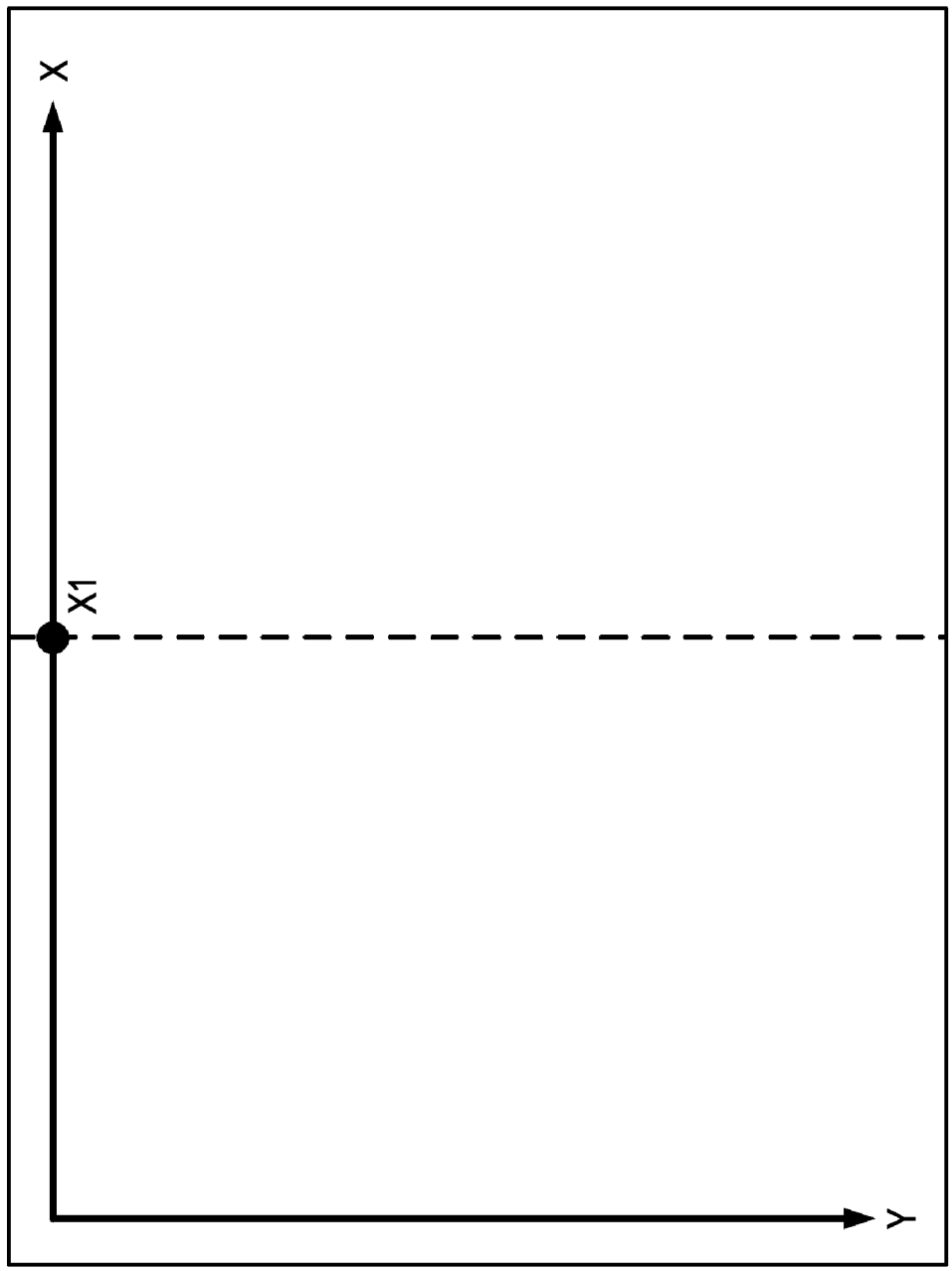
FIG. 5 shows an example of coordinate axes of a display screen.

The rotation direction (whether the left side of the window is made to be the front or the right side of the window is made to be the front) is determined by the coordinates of the window. When the X coordinate of the center coordinate of the window is to the left of a specific coordinate (a predetermined coordinate) X1, the left side of the window is made to be the front. On the other hand, when the X coordinate of the center coordinate of the window is to the right of a specific coordinate X1, the right side of the window is made to be the front (see FIG. 5). FIG. 5 shows an example of coordinate axes of a display screen.

Figure 6:
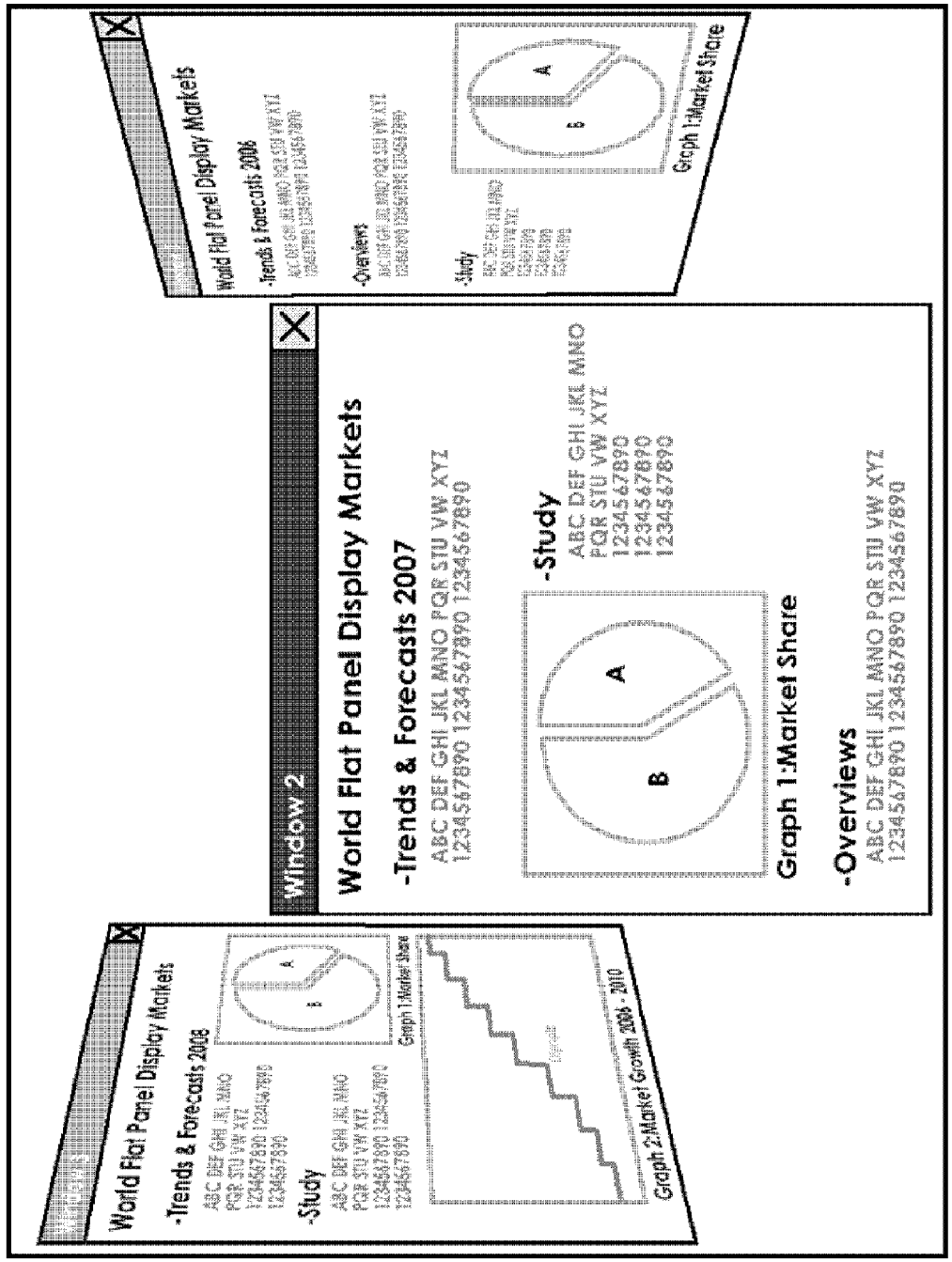
FIG. 6 shows an example of a display screen when the flowchart shown in FIG. 3 ends in the PC according to the first embodiment of the present invention.

Next, in step S204, the data controller 112, via the output unit 114, causes the display of the window "Window 3" to be rotated about the rotational axis on the basis of the calculation result in step S203, thereby changing from the two-dimensional display to a three-dimensional display (see FIG. 6). FIG. 6 shows an example of a display screen when the flowchart shown in FIG. 3 ends in the PC according to the first embodiment of the present invention. The data controller 112 stores the display coordinates in the two-dimensional display of the window "Window 3" in the HDD 107 or the like via the data storage unit 113. Then, after step S204, the data controller 112 ends the processing shown in FIG. 3.

Figure 7:
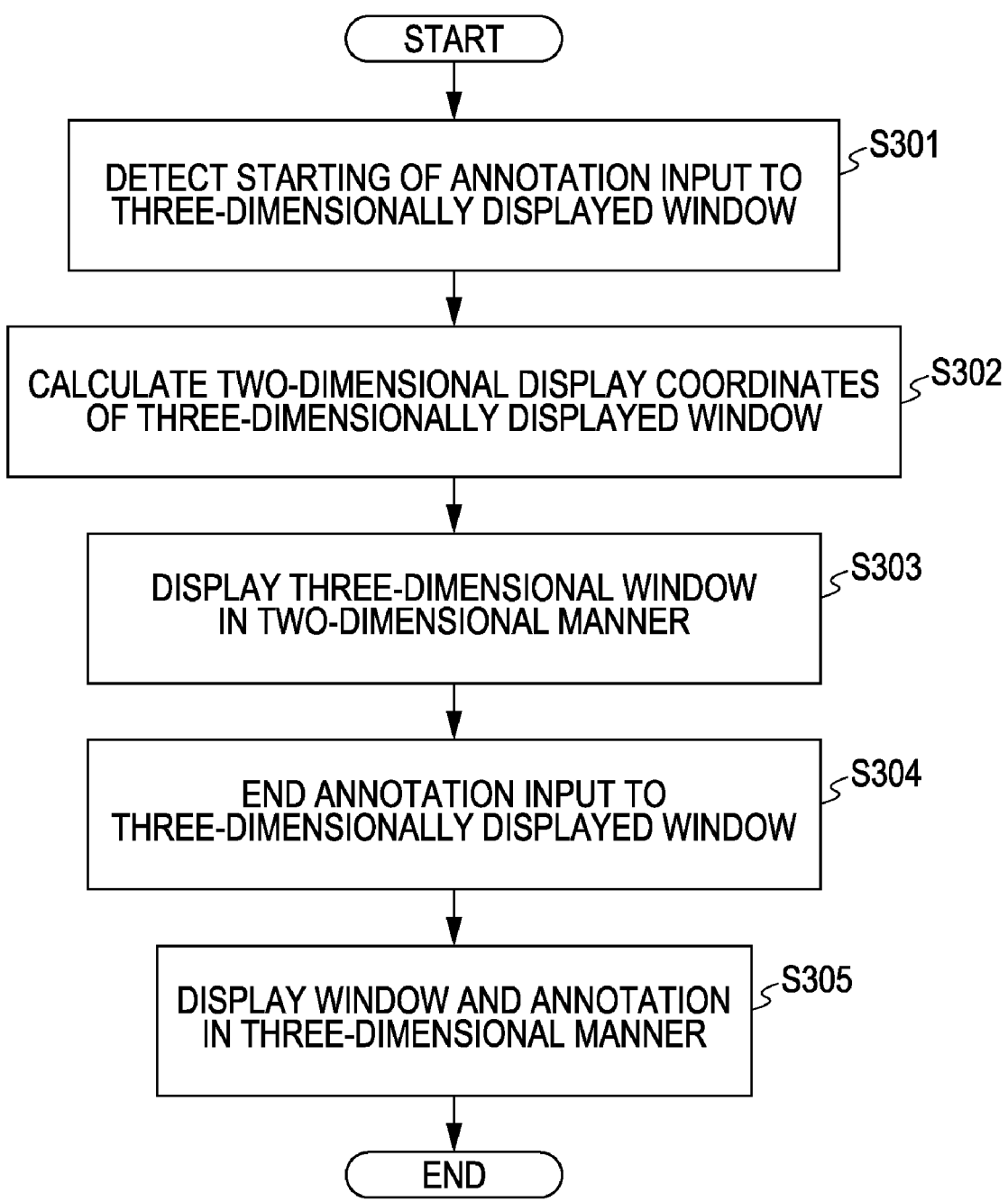
FIG. 7 is a flowchart illustrating an example of a process for performing an annotation operation on a three-dimensionally displayed window on the display screen of the display device 105 in the PC according to the first embodiment of the present invention.

Next, a description will be given, with reference to FIG. 7, of the flow of operation for performing an annotation operation on a three-dimensionally displayed window on a display screen in a PC according to the first embodiment of the present invention. FIG. 7 is a flowchart illustrating an example of a process for performing an annotation operation on a three-dimensionally displayed window on the display screen of the display device 105 in the PC according to the first embodiment of the present invention.

When the process in FIG. 7 begins, the data controller 112 has already displayed three windows on the display screen of the display device 105 via the output unit 114, as shown in FIG. 6, with the windows "Window 1" and "Window 3" being displayed in a three-dimensional manner. Furthermore, the data controller 112 has already displayed the window "Window 2" in a two-dimensional manner.

In step S301, the data controller 112 detects via the input unit 115 that the user has started an annotation input to the window "Window 3" on the display screen.

Next, in step S302, the data controller 112 calculates display coordinates at which the window "Window 3" is rotated about a rotational axis, which is parallel to the rotational axis when the window "Window 3" is displayed in a three-dimensional manner and which intersect the start coordinate (the origin at which the annotation input has started) of the annotation input, and is displayed in a two-dimensional manner.

Figure 8:
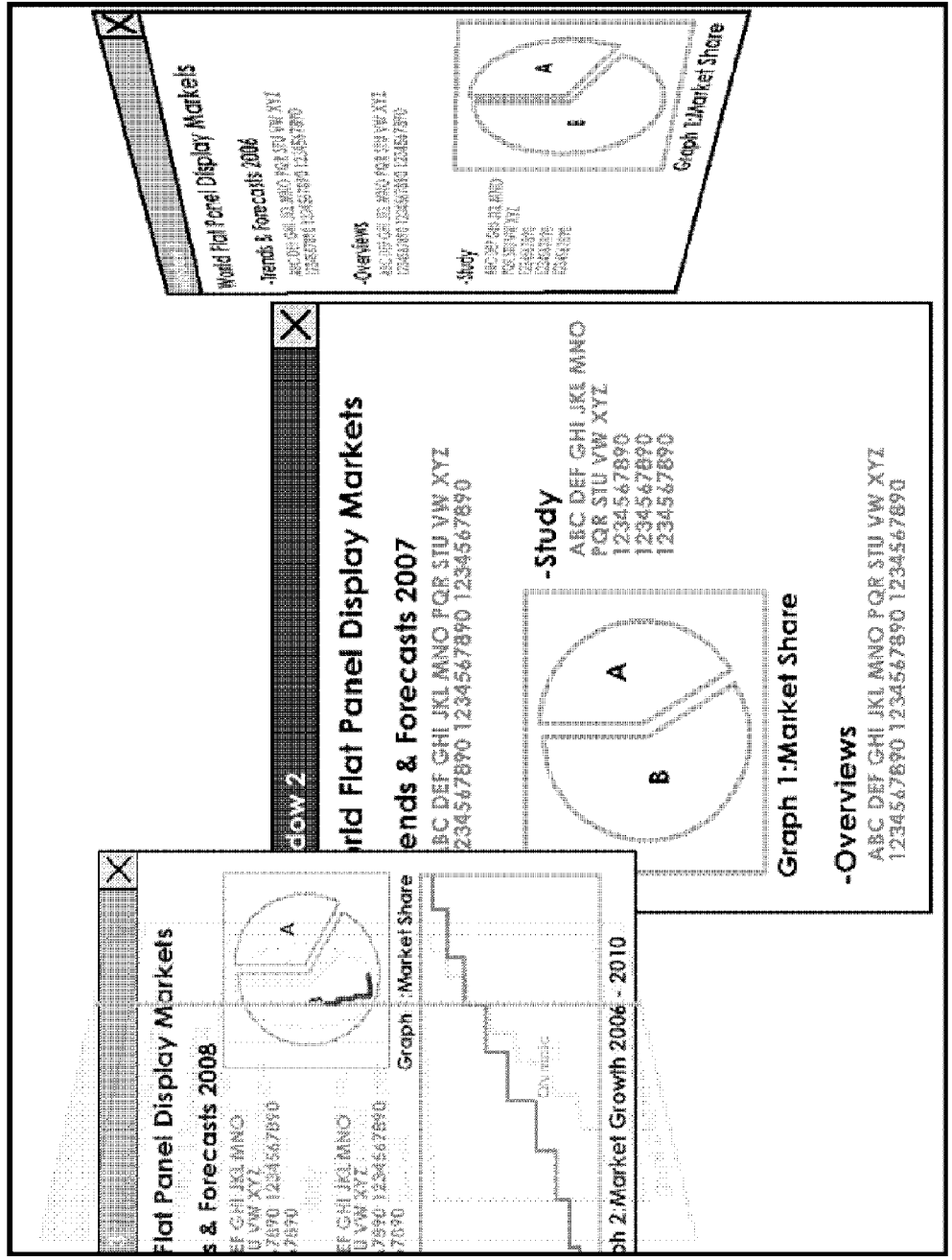
FIG. 8 shows an example of a display screen when the display of windows on which an annotation operation is to be performed has been changed from a three-dimensional display to a two-dimensional display in the PC according to the first embodiment of the present invention.

Next, in step S303, the data controller 112, via the output unit 114, causes the display of the window "Window 3" to be rotated about the rotational axis on the basis of the two-dimensional display coordinates of the window "Window 3", which have been calculated in step S302. As a result, the display is changed from the three-dimensional display to a two-dimensional display (see FIG. 8). FIG. 8 shows an example of a display screen when the display of windows on which an annotation operation is to be performed has been changed from the three-dimensional display to a two-dimensional display. The data controller 112 stores the three-dimensional display coordinates of the window "Window 3" in the HDD 107 via the data storage unit 113. Furthermore, the data controller 112, via the output unit 114, causes the result of the annotation input by the user to be reflected in the window on which a two-dimensional display is made.

Figure 9:
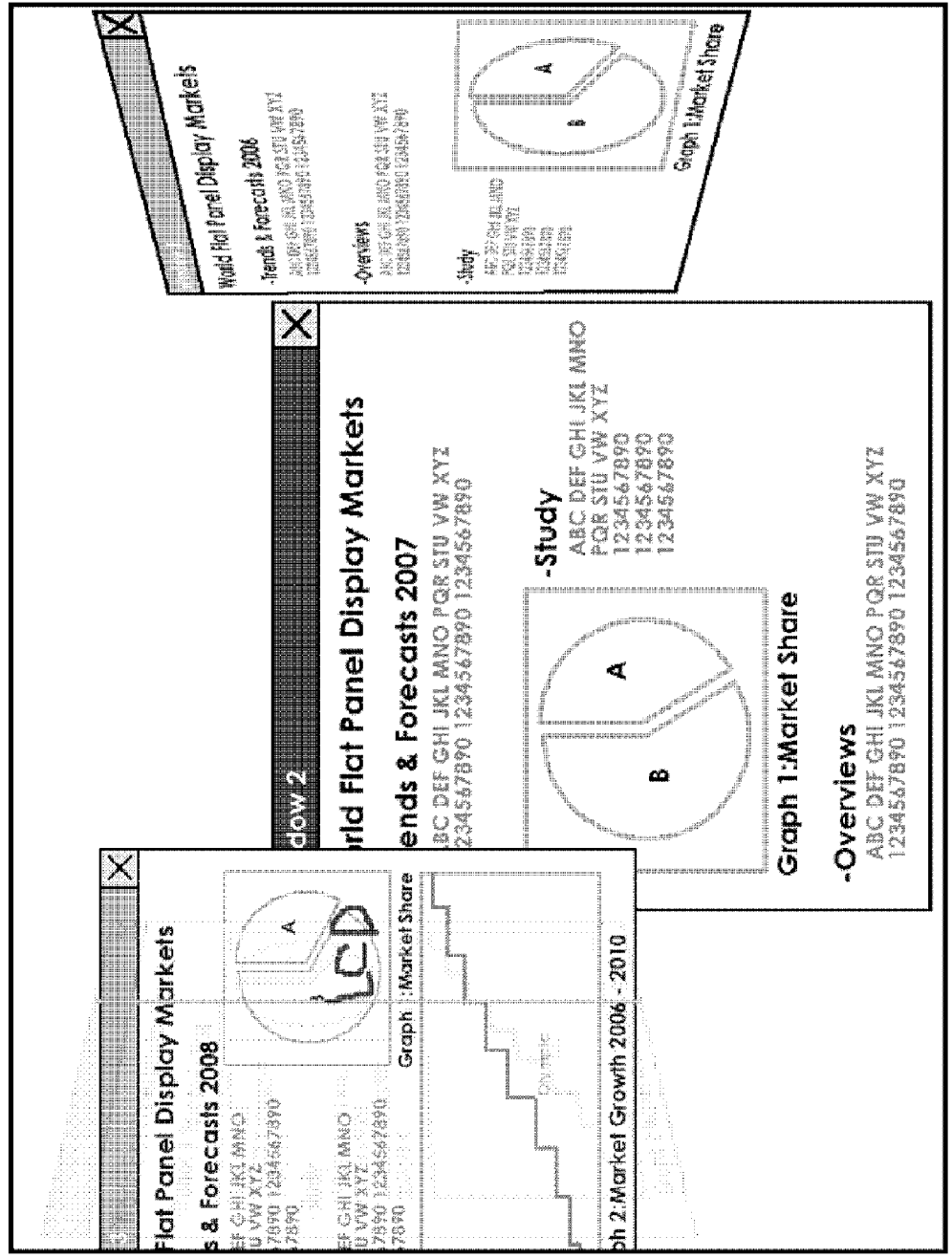
FIG. 9 shows an example of a display screen at the time of step S304 in the PC according to the first embodiment of the present invention.

Next, in step S304, the data controller 112 detects that the user has ended the annotation input to the window "Window 3" on the display screen via the input unit 115. FIG. 9 shows an example of a display screen at the time of step S304.

Figure 10:
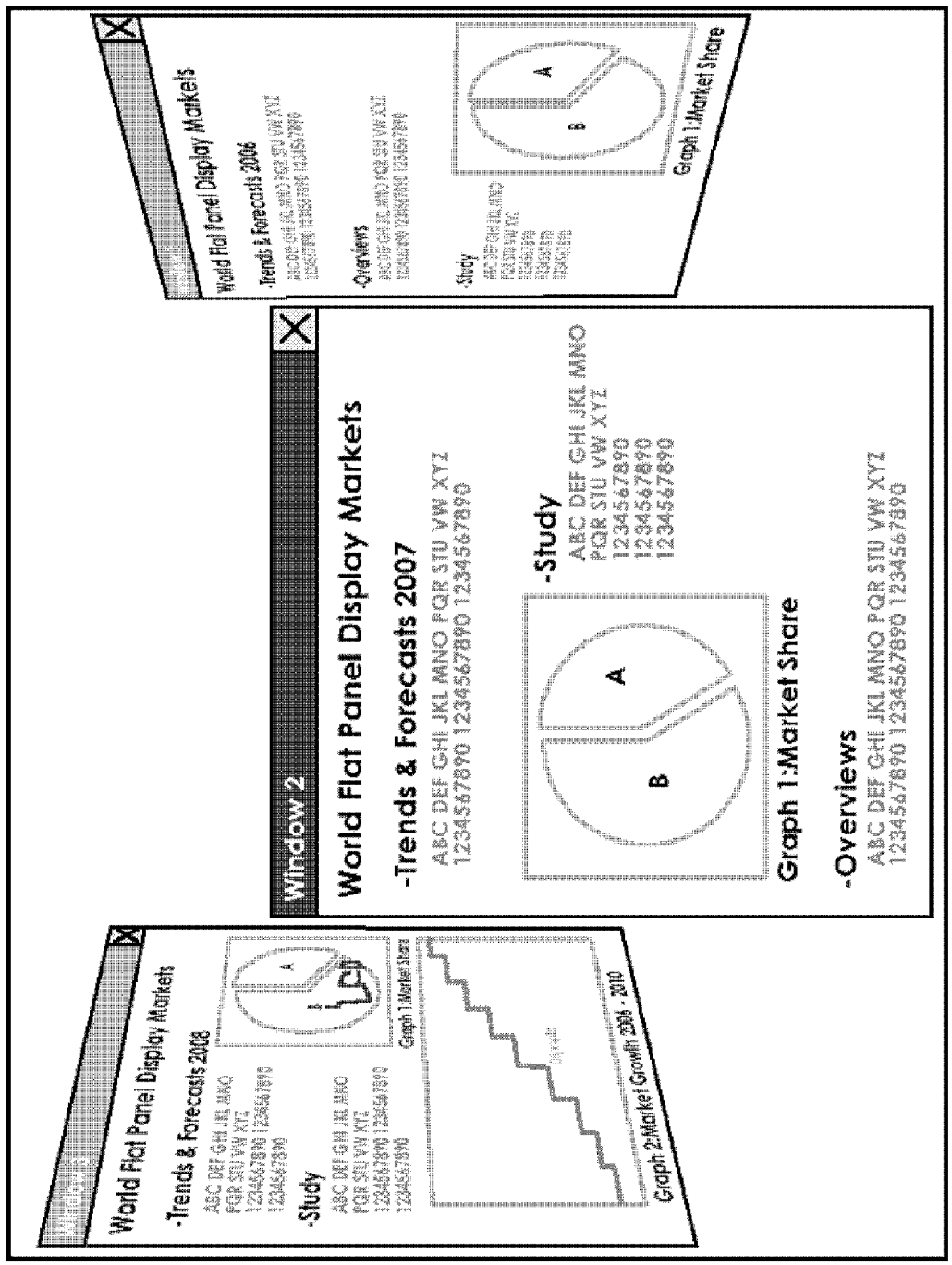
FIG. 10 shows an example of a display screen when the flowchart shown in FIG. 7 ends in the PC according to the first embodiment of the present invention.

Next, in step S305, on the basis of the three-dimensional display coordinates of the window "Window 3", which have been stored in the HDD 107, the data controller 112 causes the display of the window "Window 3" to be rotated about the rotational axis. As a result, the window "Window 3" is returned from the two-dimensional display to a three-dimensional display. Furthermore, the data controller 112, via the output unit 114, causes the display of the annotation to be rotated about the rotational axis in synchronization with the changing from the three-dimensional display of the window "Window 3" to a two-dimensional display. As a result, the annotation (the content of annotation, which is the result of the annotation) is changed from the two-dimensional display to a three-dimensional display (see FIG. 10). FIG. 10 shows an example of a display screen when the flowchart shown in FIG. 7 ends. After step S305, the data controller 112 ends the processing shown in FIG. 7.

In the manner described above, according to the first embodiment of the present invention, the coordinates at which an annotation input has started become the same on the display screen between the three-dimensional display of the window and the two-dimensional display of the window. Therefore, it is possible for the user to perform an annotation operation without feeling annoyance. That is, the position at which annotation is started to be written on a window in a three-dimensional state does not offset from the position of the pen when a two-dimensional window is formed.

Furthermore, it is not necessary for the user to change the three-dimensional display to a two-dimensional display when performing an annotation operation.

In the first embodiment, a description has been given under the assumption that the display coordinates when changing the two-dimensional window to a three-dimensional window obey the above-described specific rules. Alternatively, the two-dimensional window may obey a rule other than the above-described rules, and the user may manually determine the display coordinates of the three-dimensional window. For example, in the above-described rules, the rotational axis is assumed to be a vertical axis passing through the center of the window. Alternatively, for example, the rotational axis may be a horizontal axis passing through the center of the window on the display screen.

Second Embodiment

Figure 11:
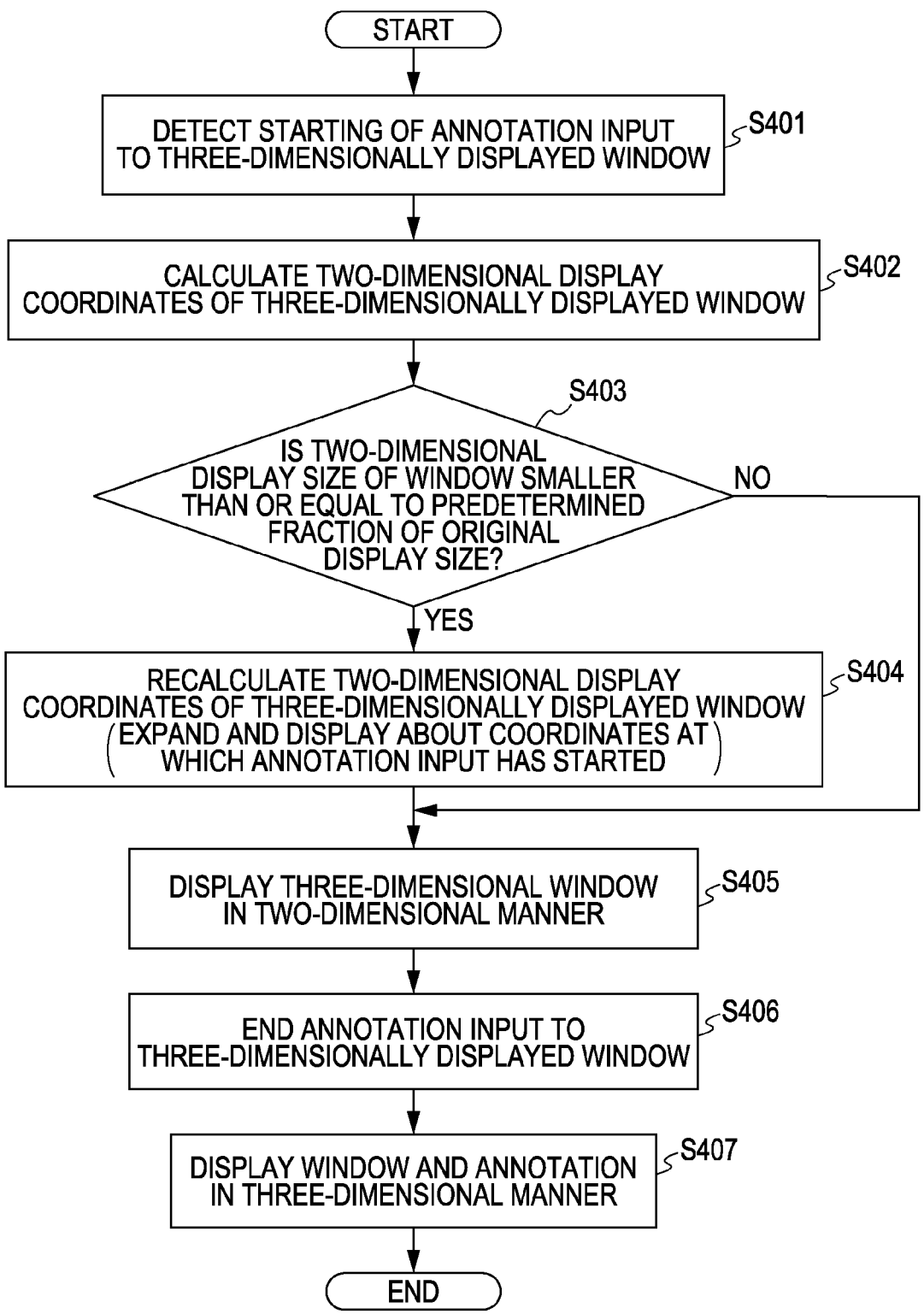
FIG. 11 is a flowchart illustrating an example of a process for performing an annotation operation on a three-dimensionally displayed window on the display screen of the display device 105 in a PC according to a second embodiment of the present invention.

A description will now be given, with reference to FIG. 11, of the flow of operation for performing an annotation operation on a three-dimensionally displayed window on a display screen in a PC according to a second embodiment of the present invention. In this embodiment, differences from the above-described embodiment will be mainly described. FIG. 11 is a flowchart illustrating an example of a process for performing an annotation operation on a three-dimensionally displayed window on the display screen of the display device 105 in the PC according to the second embodiment of the present invention.

When the process in FIG. 11 begins, it is assumed that the data controller 112 has already displayed three windows on the display screen of the display device 105, as shown in FIG. 6, with windows "Window 1" and "Window 3" being displayed in a three-dimensional manner. Furthermore, the data controller 112 has already displayed a window "Window 2" in a two-dimensional manner.

In step S401, the data controller 112 detects that the user has started an annotation input to the window "Window 3" on the display screen via the input unit 115.

Next, in step S402, the data controller 112 calculates the display coordinates at which the window "Window 3" is rotated about a rotational axis, which is parallel to the rotational axis when a three-dimensional display is to be performed and which intersects the coordinates at which the annotation input has started, and is displayed in a two-dimensional manner.

Next, in step S403, the data controller 112 performs the following processes. That is, the data controller 112 checks whether or not the two-dimensional display size of the window "Window 3", which has been calculated in step S402, is smaller than a predetermined fraction of the original two-dimensional display size of the window "Window 3", which has been stored in the HDD 107. When the two-dimensional display size of the window "Window 3" is smaller than the predetermined fraction of the original two-dimensional display size of the window "Window 3", the data controller 112 causes the process to proceed to step S404. On the other hand, when the two-dimensional display size of the window "Window 3" is greater than or equal to the predetermined fraction of the original two-dimensional display size of the window "Window 3", the data controller 112 causes the process to proceed to step S405.

In step S404, the data controller 112 recalculates the two-dimensional display coordinates of the window "Window 3". In the recalculation, the data controller 112 calculates so that the two-dimensional display size of the window "Window 3" becomes greater than the predetermined fraction of the original two-dimensional display size. In more detail, the data controller 112 calculates the two-dimensional display size of the window "Window 3" so that the window "Window 3" is expanded and displayed about the coordinates at which the user has started the annotation input.

Figure 12:
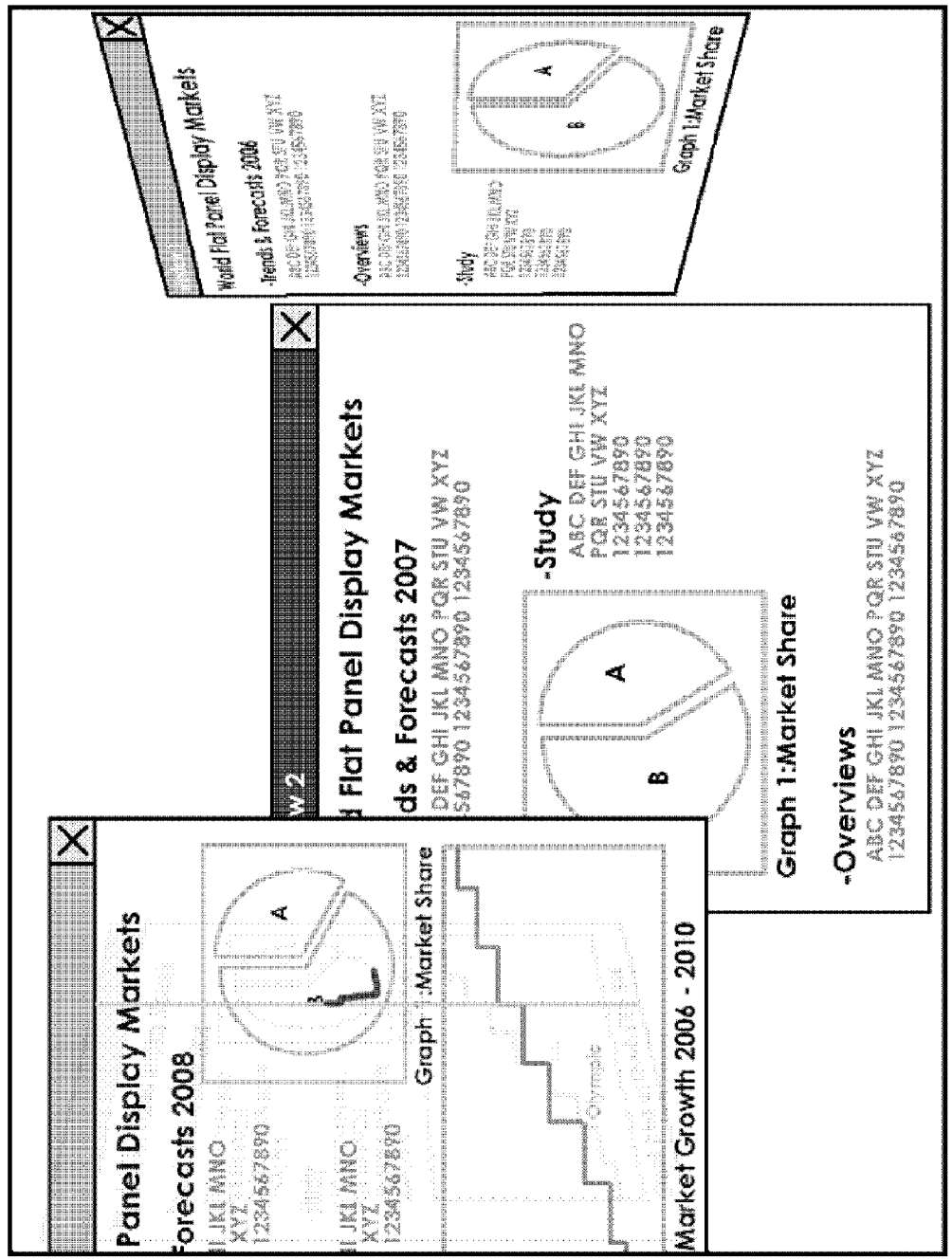
FIG. 12 shows an example of a display screen when the display of windows on which an annotation operation is to be performed has been changed from a three-dimensional display to a two-dimensional display in the PC according to the second embodiment of the present invention.

Next, in step S405, on the basis of the two-dimensional display coordinates of the window "Window 3", which have been calculated in step S402 or S404, the data controller 112 causes the display of the window "Window 3" to be rotated about the rotational axis via the output unit 114. As a result, the display is changed from the three-dimensional display to a two-dimensional display (see FIG. 12). FIG. 12 shows an example of a display screen when the display of windows on which an annotation operation is to be performed has been changed from a three-dimensional display to a two-dimensional display. In FIG. 12, the window "Window 3" has been displayed on the basis of the display size recalculated in step S404. The data controller 112 stores the three-dimensional display coordinates of the window "Window 3" in the HDD 107 via the data storage unit 113.

Figure 13:
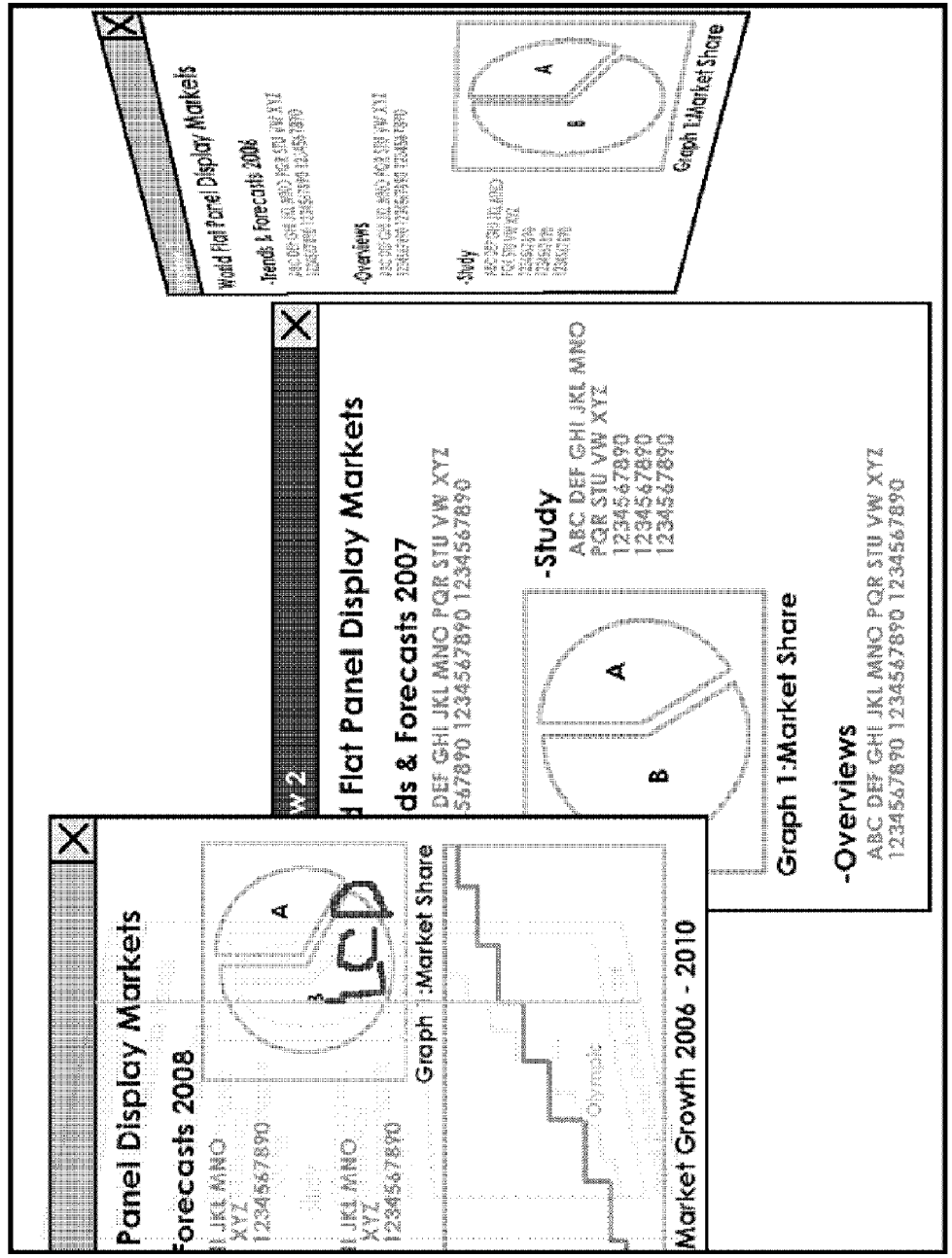
FIG. 13 shows an example of a display screen at the time of step S406.

Next, in step S406, the data controller 112 detects that the user has ended the annotation input to the window "Window 3" via the input unit 115. FIG. 13 shows an example of a display screen at the time of step S406.

Figure 14:
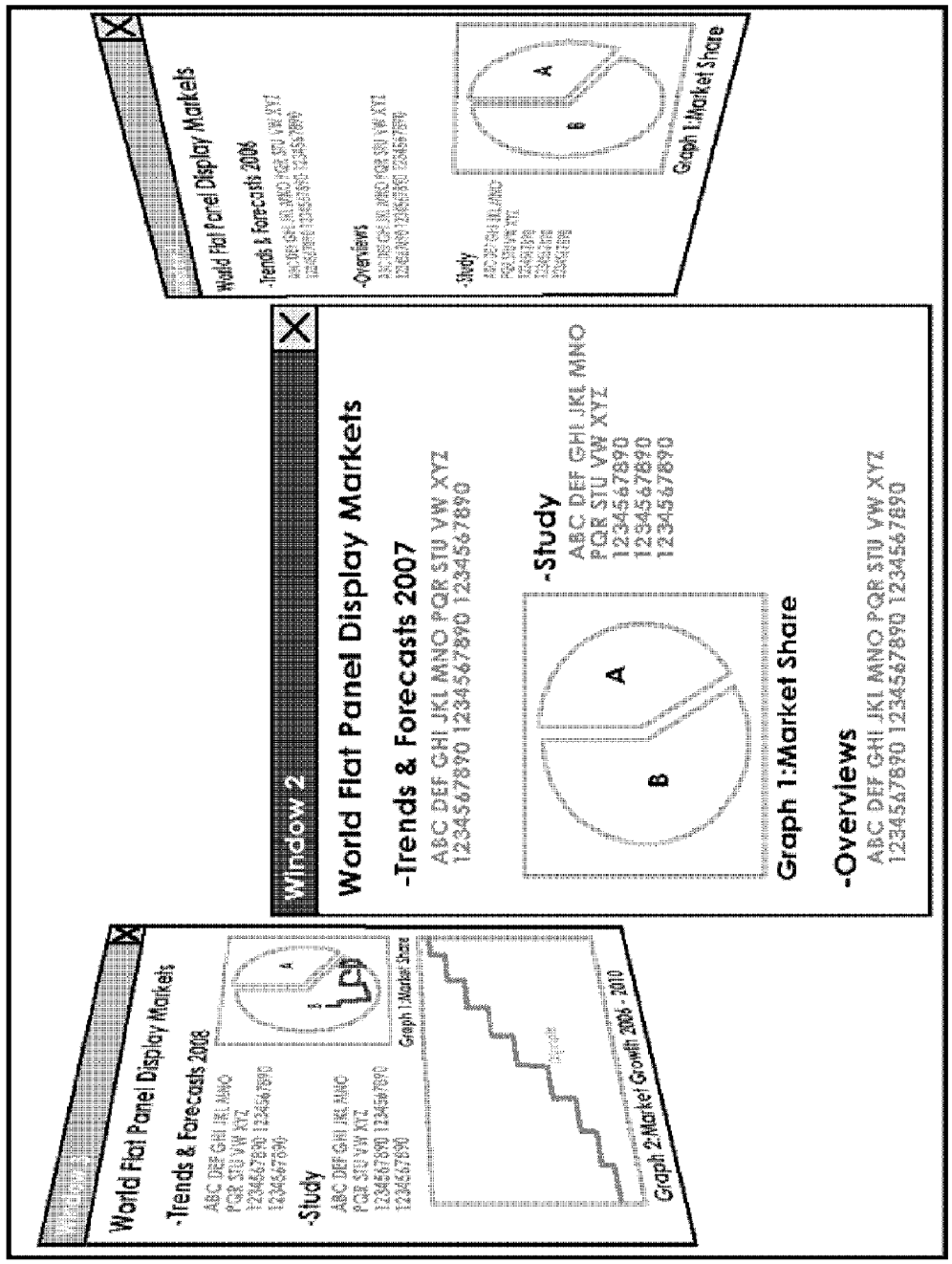
FIG. 14 shows an example of a display screen when the flowchart shown in FIG. 11 ends.

Next, in step S407, on the basis of the three-dimensional display coordinates of the window "Window 3", which have been stored in the HDD 107, the data controller 112 causes the display of the window "Window 3" to be rotated about the rotational axis via the output unit 114. As a result, the window "Window 3" is returned from the two-dimensional display to the three-dimensional display. In addition, the data controller 112, via the output unit 114, causes the display of the annotation to be rotated about the rotational axis in synchronization with the changing from the three-dimensional display of the window "Window 3" to the two-dimensional display. As a result, the annotation is changed from the two-dimensional display to a three-dimensional display (see FIG. 14). FIG. 14 shows an example of a display screen when the flowchart shown in FIG. 11 ends. Then, after step S407, the data controller 112 ends the processing shown in FIG. 11.

In the manner described above, according to the second embodiment of the present invention, in addition to the advantages of the above-described first embodiment, when an annotation operation is performed on a two-dimensionally formed window, the window is expanded about the coordinates at which the annotation input has started and is displayed large. As a result, it is possible for the user to easily perform an annotation operation on a window.

Third Embodiment

Figure 15:
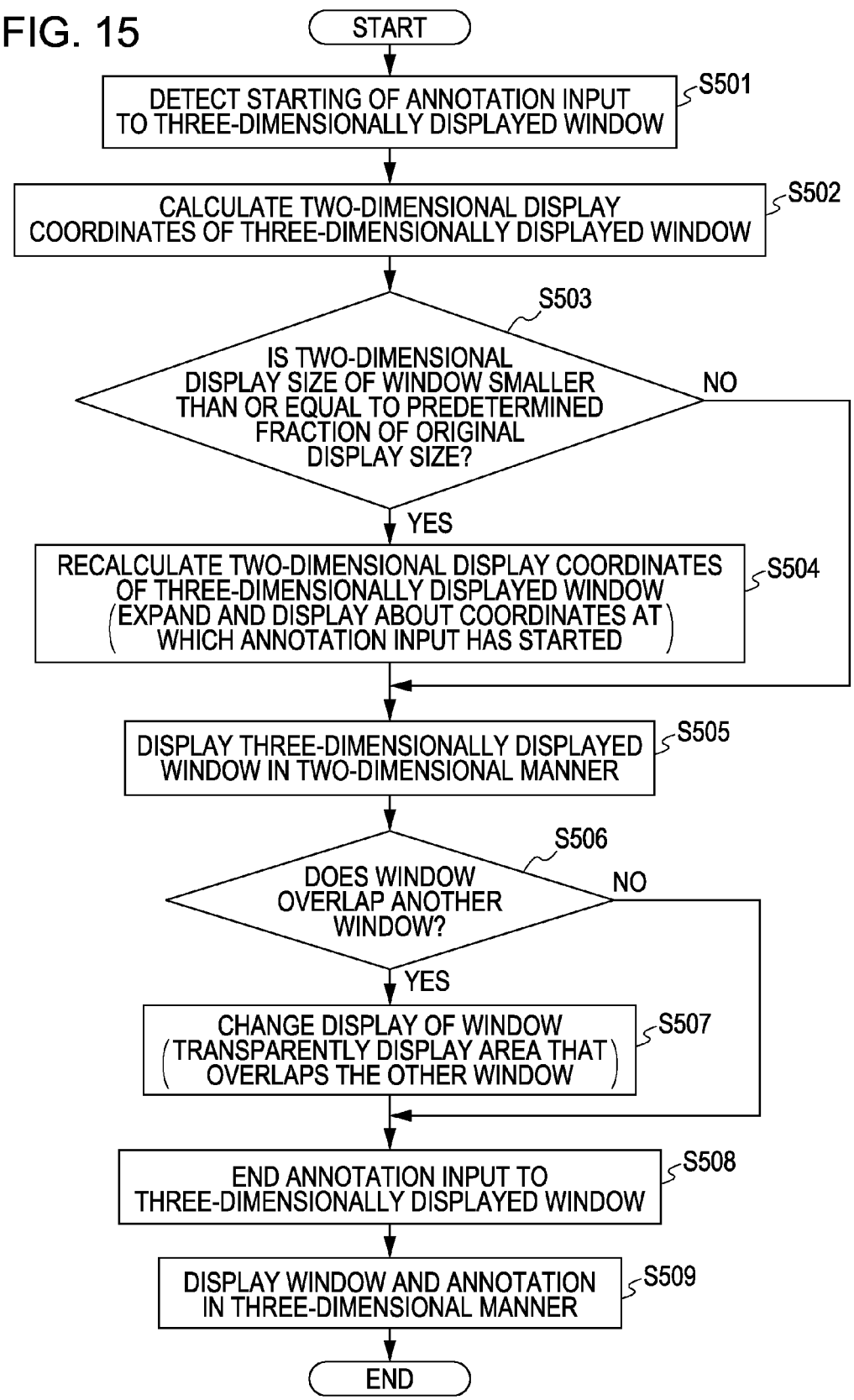
FIG. 15 is a flowchart illustrating an example of a process for performing an annotation operation on a three-dimensionally displayed window on the display screen of the display device 105 in a PC according to a third embodiment of the present invention.

A description will now be given, with reference to FIG. 15, of the flow of operation for performing an annotation operation on a three-dimensionally displayed window on a display screen in a PC according to a third embodiment of the present invention. In this embodiment, differences from the above-described embodiments will be mainly described. FIG. 15 is a flowchart illustrating an example of a process for performing an annotation operation on a three-dimensionally displayed window on the display screen of the display device 105 in the PC according to the third embodiment of the present invention.

Processing when the process in FIG. 15 begins and from step S501 to step S505 are the same as the processing when the process in FIG. 11 begins and from step S401 to step S405 and accordingly, descriptions thereof are omitted.

Next, in step S506, the data controller 112 checks whether or not the window "Window 3" changed to a two-dimensionally displayed window in step S505 conceals another window. When the window "Window 3" conceals another window, the data controller 112 causes the process to proceed to step S507. On the other hand, when the window "Window 3" does not conceal another window, the data controller 112 causes the process to proceed to step S508.

Figure 16:
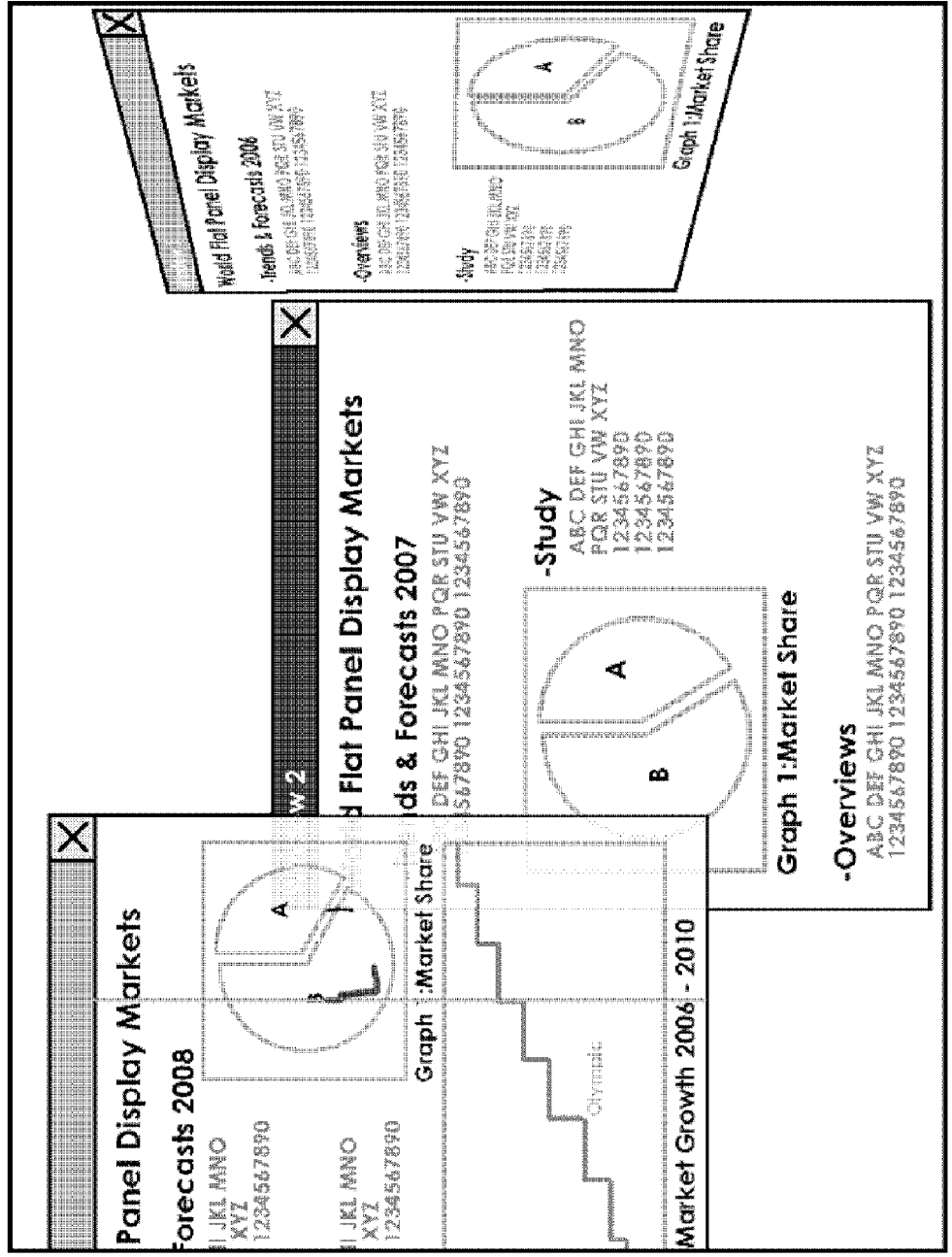
FIG. 16 shows an example of a display screen when the display of windows on which an annotation operation is to be performed has been changed from a three-dimensional display to a two-dimensional display in the PC according to the third embodiment of the present invention.

In step S507, the data controller 112, via the output unit 114, transparently displays an area of the window "Window 3" which overlaps and conceals another window so that the hidden area of the other window can be viewed (see FIG. 16). FIG. 16 shows an example of a display screen when the display of windows on which an annotation operation is to be performed has been changed from a three-dimensional display to a two-dimensional display.

Figure 17:
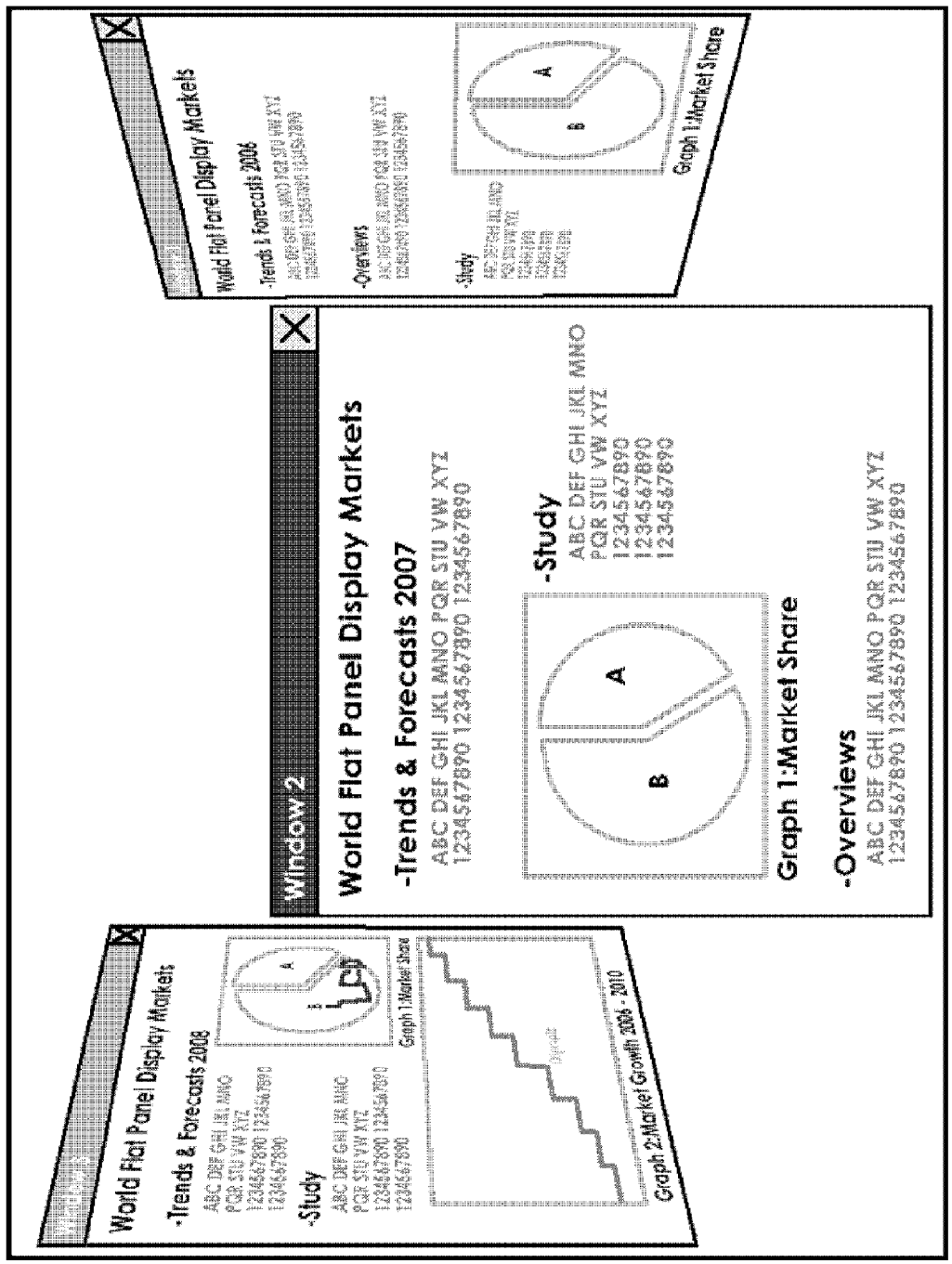
FIG. 17 shows an example of a display screen when the flowchart shown in FIG. 15 ends.

Steps S508 and S509, and the end time in FIG. 15 are the same as steps S406 and S407 and the end time in FIG. 11 and accordingly, descriptions thereof are omitted. The screen display at the end time is as shown in FIG. 17. FIG. 17 shows an example of a display screen when the flowchart shown in FIG. 15 ends.

In the manner described above, according to the third embodiment of the present invention, in addition to the advantages of the above-described first and second embodiments, an area overlapping another window is transparently displayed when an annotation operation is to be performed on a two-dimensionally formed window. As a result, it is possible for the user to perform an annotation operation while referring to another window information.

Fourth Embodiment

Figure 18:
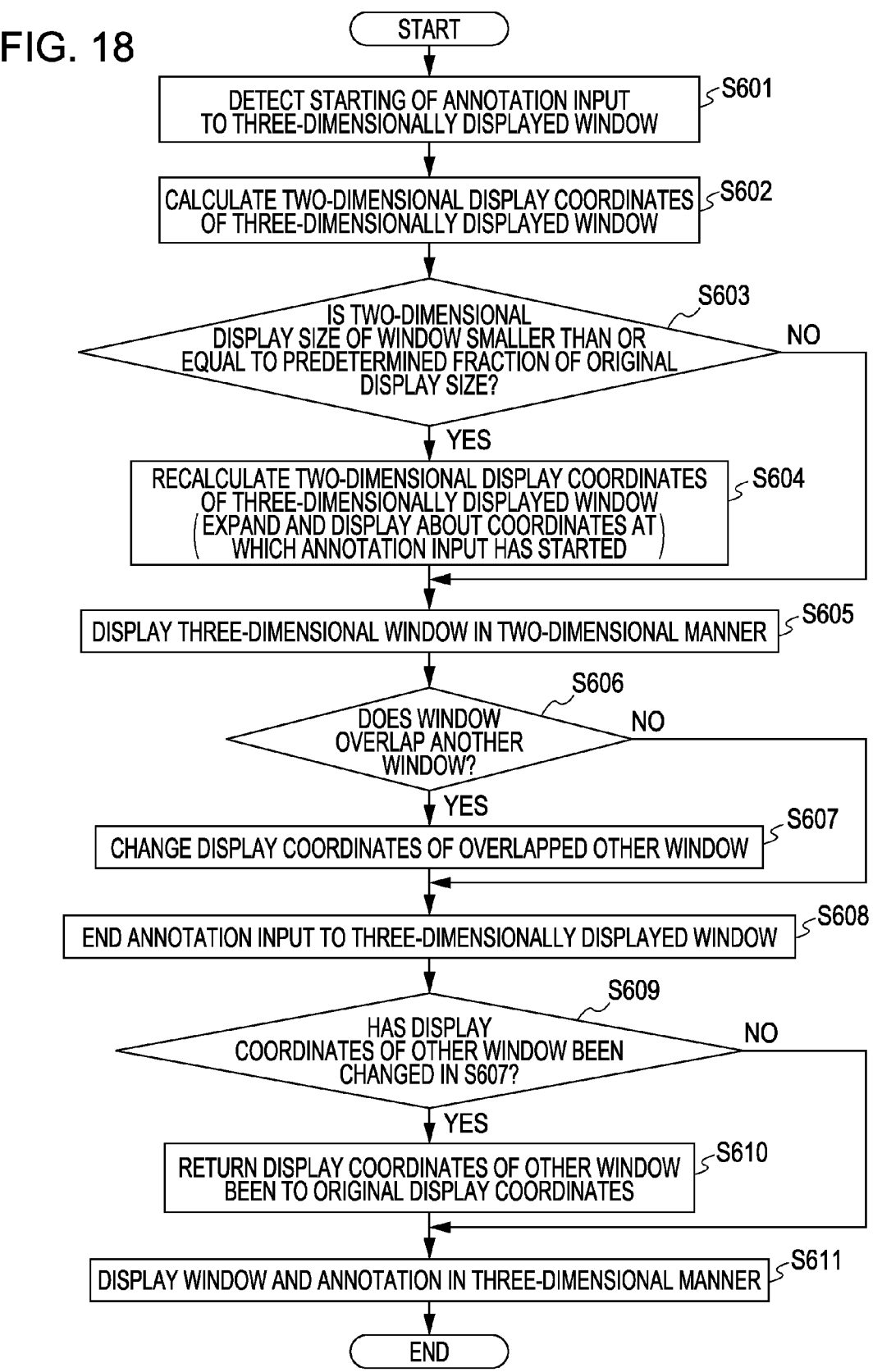
FIG. 18 is a flowchart illustrating an example of a process for performing an annotation operation on a three-dimensionally displayed window on the display screen of the display device 105 in a PC according to a fourth embodiment of the present invention.

A description will now be given, with reference to FIG. 18, of the flow of operation on a three-dimensionally displayed window on a display screen in a PC according to a fourth embodiment of the present invention. In this embodiment, differences from the above-described embodiments will be mainly described. FIG. 18 is a flowchart illustrating an example of a process for performing an annotation operation on a three-dimensionally displayed window on the display screen of the display device 105 in the PC according to the fourth embodiment of the present invention.

Figure 19:
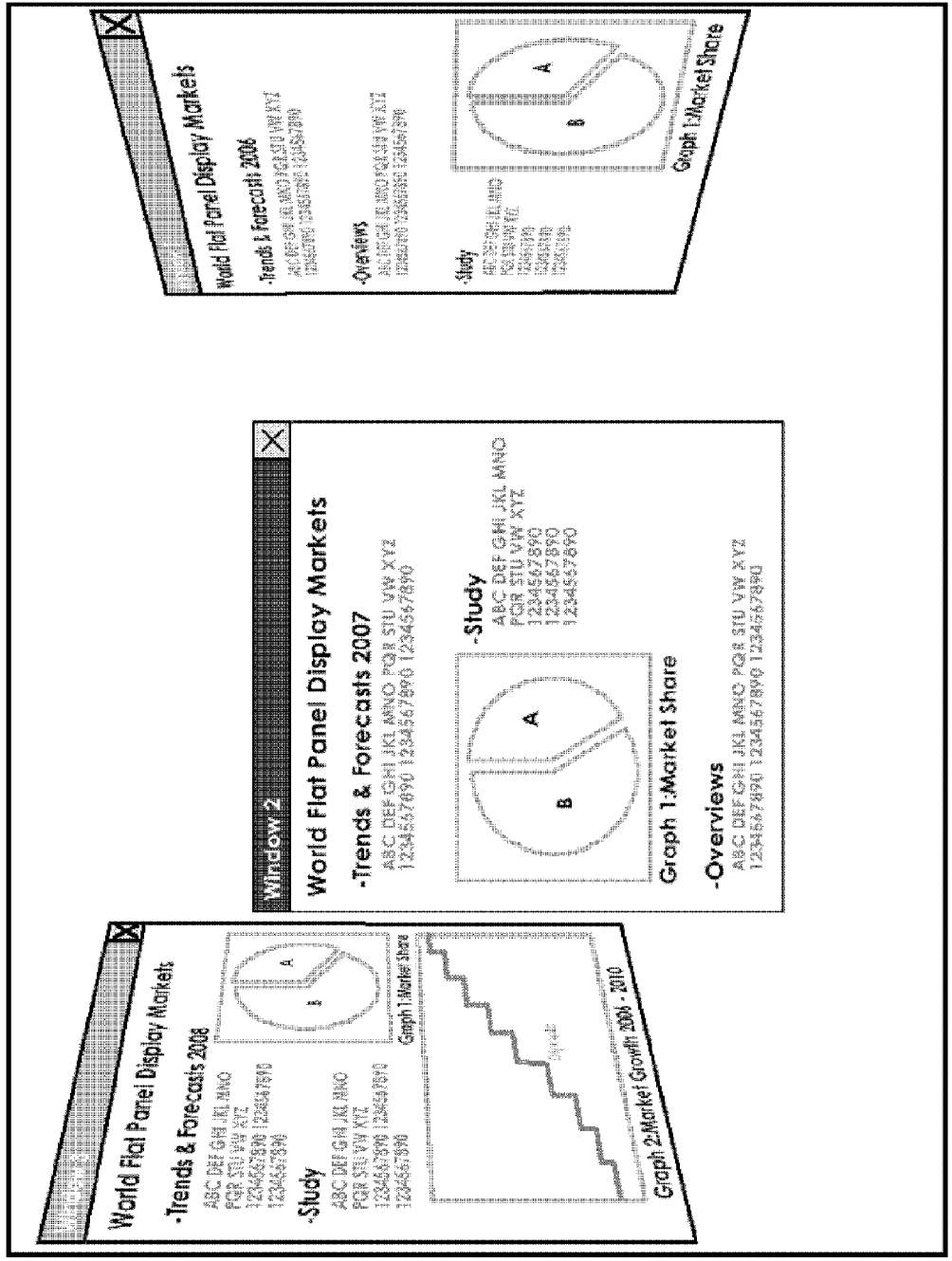
FIG. 19 shows an example of a display screen when the flowchart shown in FIG. 18 begins.

When the process in FIG. 18 begins, it is assumed that the data controller 112 has already displayed three windows on the display screen of the display device 105 via the output unit 114, as shown in FIG. 19, with windows "Window 1" and "Window 3" being displayed in a three-dimensional manner. Furthermore, the data controller 112 has already displayed a window "Window 2" in a two-dimensional manner. FIG. 19 shows an example of a display screen when the flowchart shown in FIG. 18 begins.

The processing from step S601 to step S606 is the same as the processing from step S501 to step S506 in FIG. 15 and accordingly, descriptions thereof are omitted.

Figure 20:
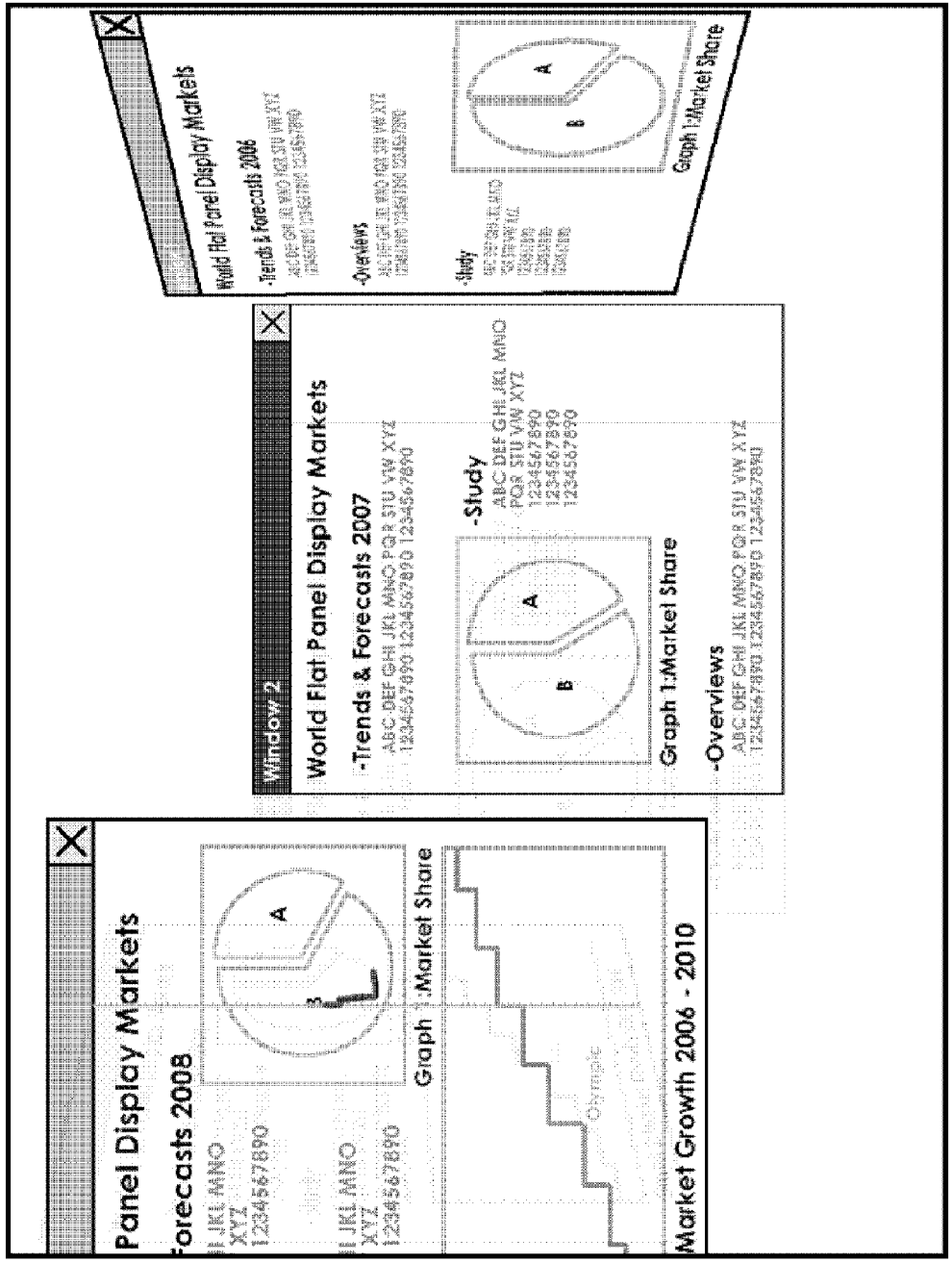
FIG. 20 shows an example of a display screen when the display of windows on which an annotation operation is to be performed has been changed from a three-dimensional display to a two-dimensional display in the PC according to the fourth embodiment of the present invention.

Next, in step S607, the data controller 112 performs the following processes. That is, the data controller 112 changes the display coordinates of another window overlapped by the window "Window 3" via the output unit 114 so that the other window is not concealed by the window "Window 3", and displays the other window (see FIG. 20). That is, the data controller 112 moves the other window overlapped by the window "Window 3" to a position at which the other window is not concealed by the window "Window 3" via the output unit 114. FIG. 20 shows an example of a display screen when the display of windows on which an annotation operation is to be performed has been changed from a three-dimensional display to a two-dimensional display. At this time, the data controller 112 stores the coordinates before the display coordinates of the other window are changed in the HDD 107 via the data storage unit 113.

Next, in step S608, the data controller 112 detects that the user has ended the annotation input to the window "Window 3" on the display screen via the input unit 115.

Next, in step S609, the data controller 112 checks whether or not the display coordinates of the other window have been changed in step S607. When the display coordinates of the other window have been changed, the data controller 112 causes the process to proceed to step S610. On the other hand, when the display coordinates of the other window have not been changed, the data controller 112 causes the process to proceed to step S611.

In step S610, on the basis of the coordinates before the display coordinates have been changed, which have been stored in the HDD 107 in step S607 via the output unit 114, the data controller 112 returns the display coordinates of the other window to the original coordinates.

Figure 21:
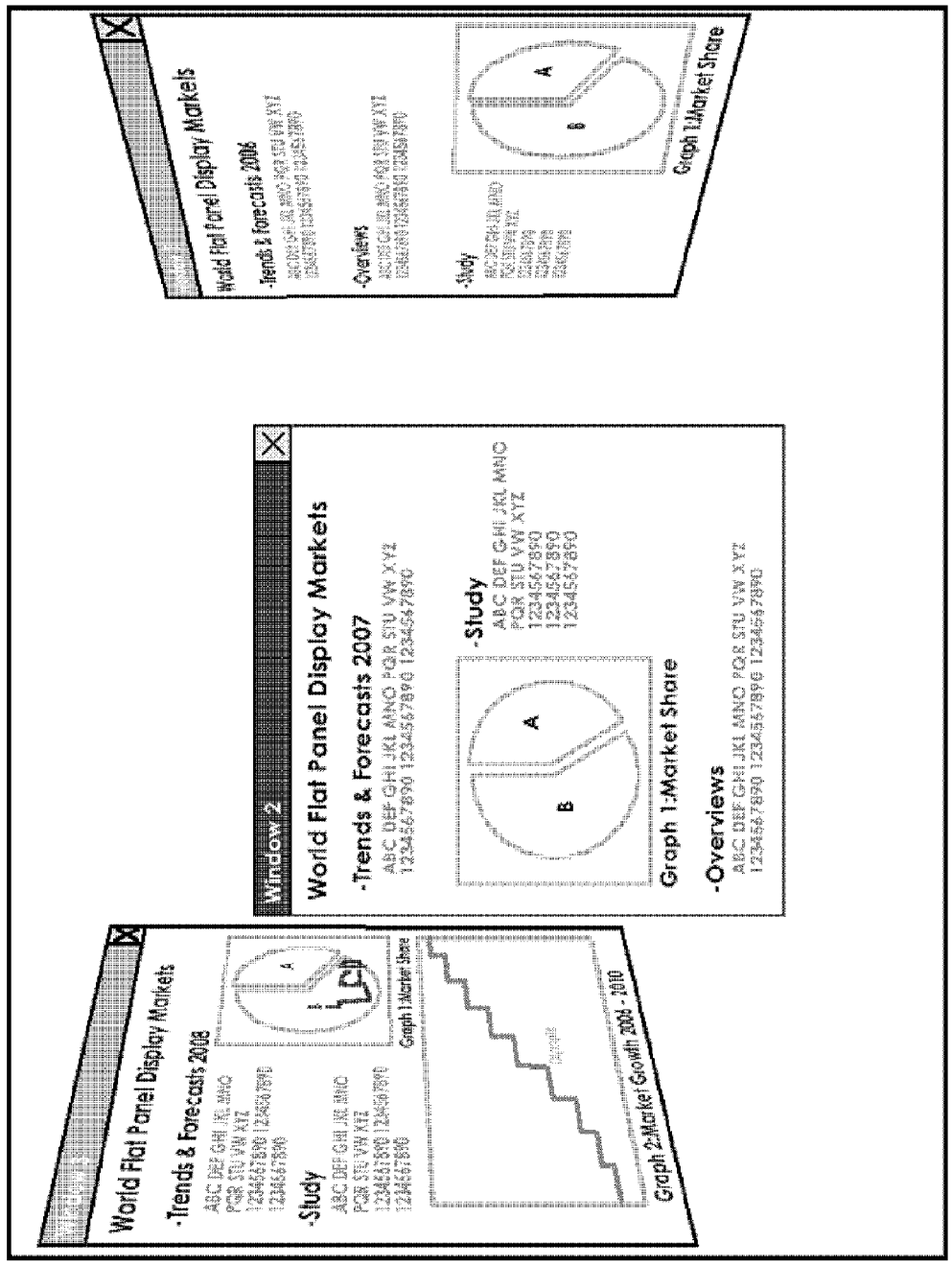
FIG. 21 shows an example of a display screen when the flowchart shown in FIG. 18 ends.

Step S611 is the same as step S509 in FIG. 15, and a description thereof is omitted. FIG. 21 shows an example of a display screen when the flowchart shown in FIG. 18 ends. Then, after step S611, the data controller 112 ends the processing shown in FIG. 18.

In the manner described above, according to the fourth embodiment of the present invention, in addition to the advantages of the first and second embodiments, there are the following advantages. That is, according to the fourth embodiment of the present invention, when performing an annotation operation on a two-dimensionally formed window, in the case that the two-dimensionally formed window overlaps another window, the display coordinates of the overlapped other window are changed to a position at which the two-dimensional window does not overlap. As a result, it is possible for the user to perform an annotation operation while referring to another window information.

Fifth Embodiment

Figure 22:
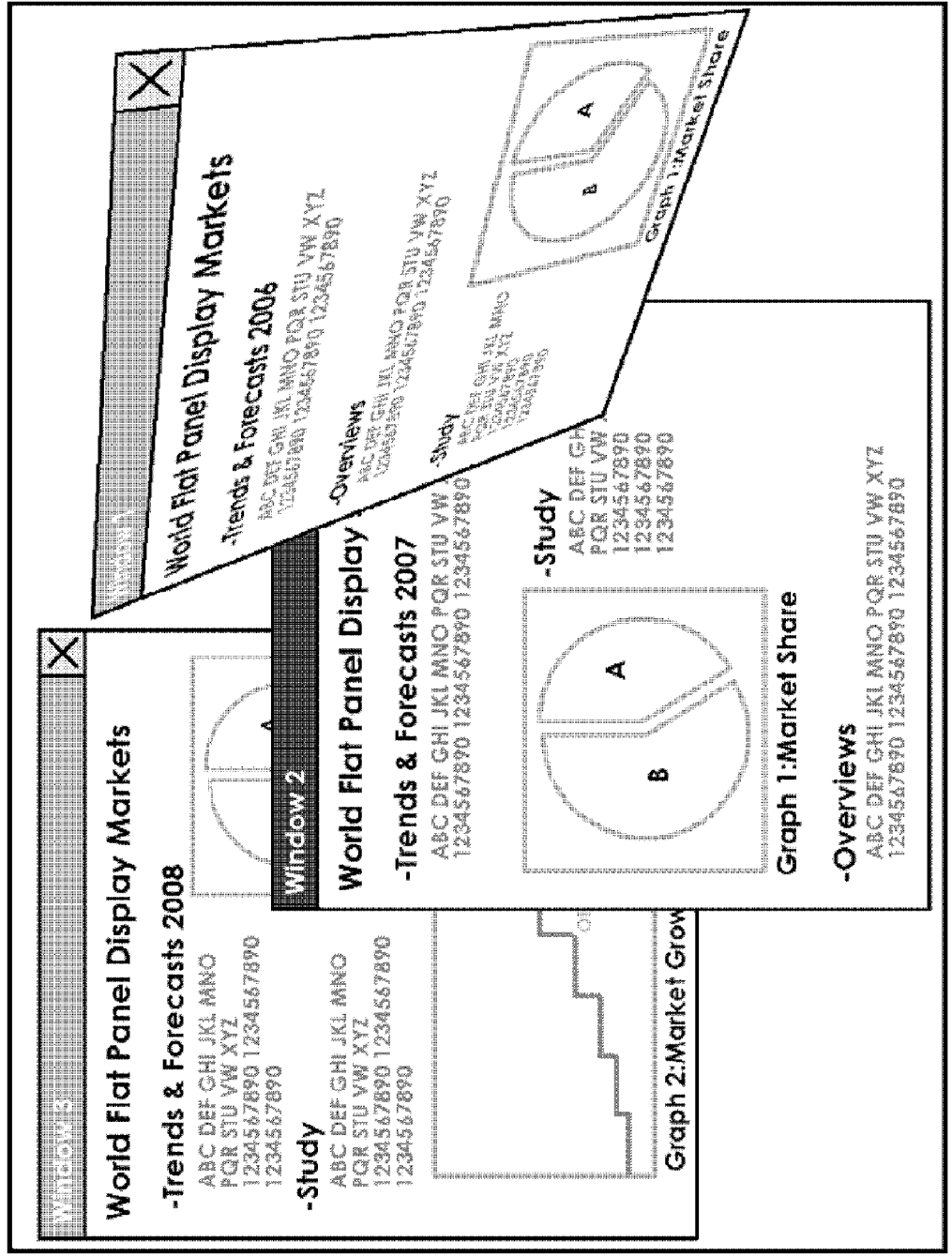
FIG. 22 shows an example of a display screen when the flowchart shown in FIG. 3 begins in a PC according to a fifth embodiment of the present invention.

A description will now be given, with reference to FIG. 3, of the flow of operation for changing the display of windows from a two-dimensional display to a three-dimensional display in a PC according to a fifth embodiment of the present invention. In this embodiment, differences from the above-described embodiments will be mainly described. When the process in FIG. 3 begins, the data controller 112 has already displayed three windows on the display screen of the display device 105 via the output unit 114, as shown in FIG. 22, with a window "Window 1" being displayed in a three-dimensional manner. Furthermore, the data controller 112 has already displayed windows "Window 2" and "Window 3" in a two-dimensional manner. FIG. 22 shows an example of a display screen when the flowchart shown in FIG. 3 begins.

In step S201, the data controller 112 detects that the user has selected the window "Window 3" via the input unit 115. Next, in step S202, the data controller 112 detects that the user has specified that the display of the window "Window 3" be changed from a two-dimensional display to a three-dimensional display via the input unit 115.

Figure 23:
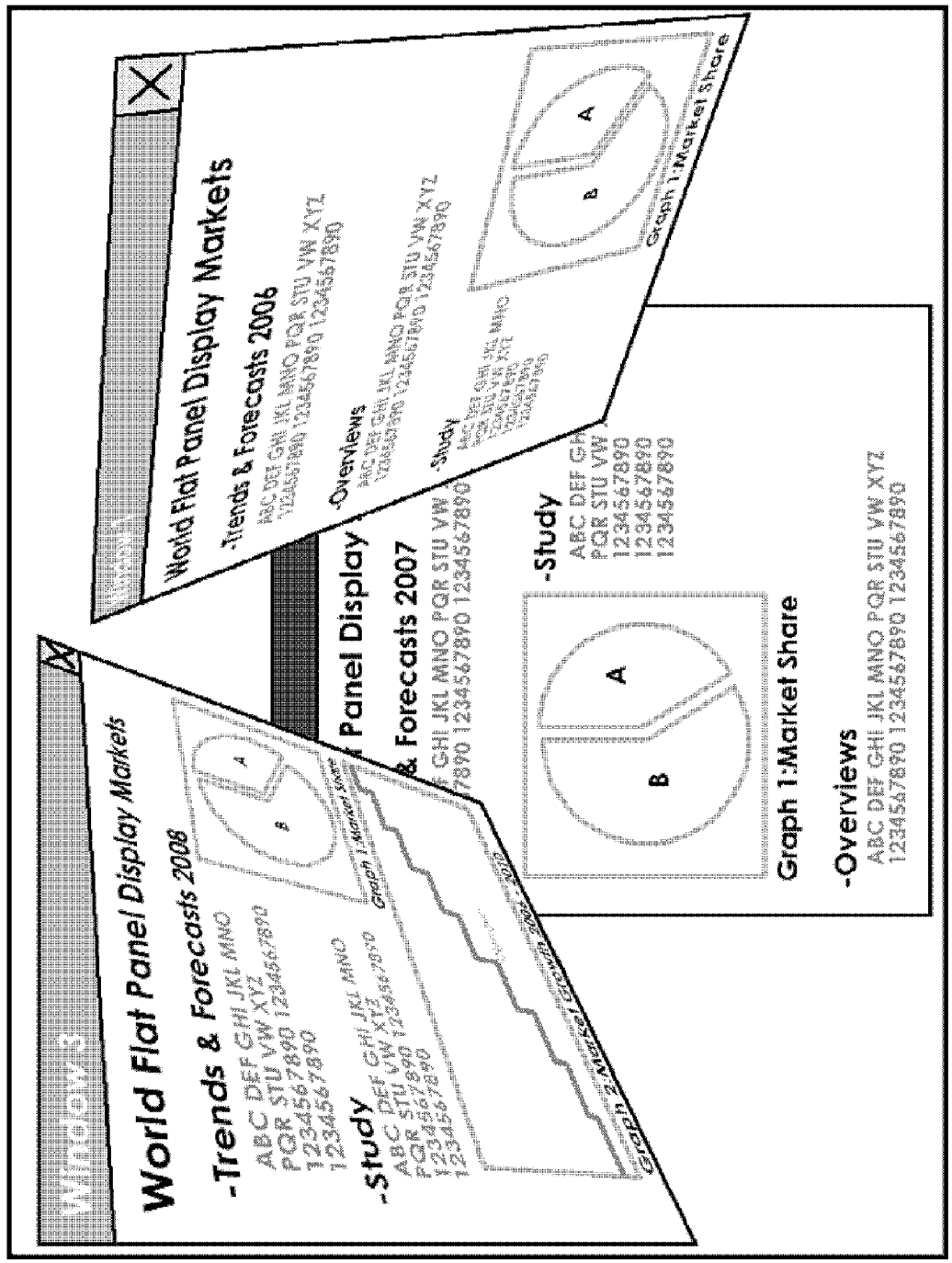
FIG. 23 shows an example of a display screen when the flowchart shown in FIG. 3 ends in the PC according to the fifth embodiment of the present invention.

Next, in step S203, the data controller 112 calculates the display coordinates in a three-dimensional display of the window "Window 3". Next, in step S204, on the basis of the calculation result in step S203 via the output unit 114, the data controller 112 causes the window "Window 3" to be rotated about a particular point on the window plane (on the display screen). As a result, the display of the window "Window 3" is changed from the two-dimensional display to a three-dimensional display (see FIG. 23). FIG. 23 shows an example of a display screen when the flowchart shown in FIG. 3 ends. The data controller 112 stores the display coordinates in the two-dimensional display of the window "Window 3" in the HDD 107 via the data storage unit 113. Then, after step S204, the data controller 112 ends the processing shown in FIG. 3.

In the manner described above, according to the fifth embodiment of the present invention, in contrast with the first to fourth embodiments described above, when the display of a window is changed from a two-dimensional display to a three-dimensional display, the window is rotated about a particular point on a window plane.

Next, a description will be given, with reference to FIG. 7, of the flow of operation for performing an annotation operation on a three-dimensionally displayed window on a display screen in the PC according to the fifth embodiment of the present invention. When the process in FIG. 7 begins, the data controller 112 has already displayed three windows on the display screen of the display device 105 via the output unit 114, as shown in FIG. 23, with windows "Window 1" and "Window 3" being displayed in a three-dimensional manner. Furthermore, the data controller 112 has already displayed a window "Window 2" in a two-dimensional manner.

In step S301, the data controller 112 detects that the user has started an annotation input to the window "Window 3" on the display screen via the input unit 115.

Next, in step S302, the data controller 112 calculates the display coordinates at which the window "Window 3" is rotated about the start coordinates of the annotation input (the origin at which the annotation input has started) and is displayed in a two-dimensional manner.

Figure 24:
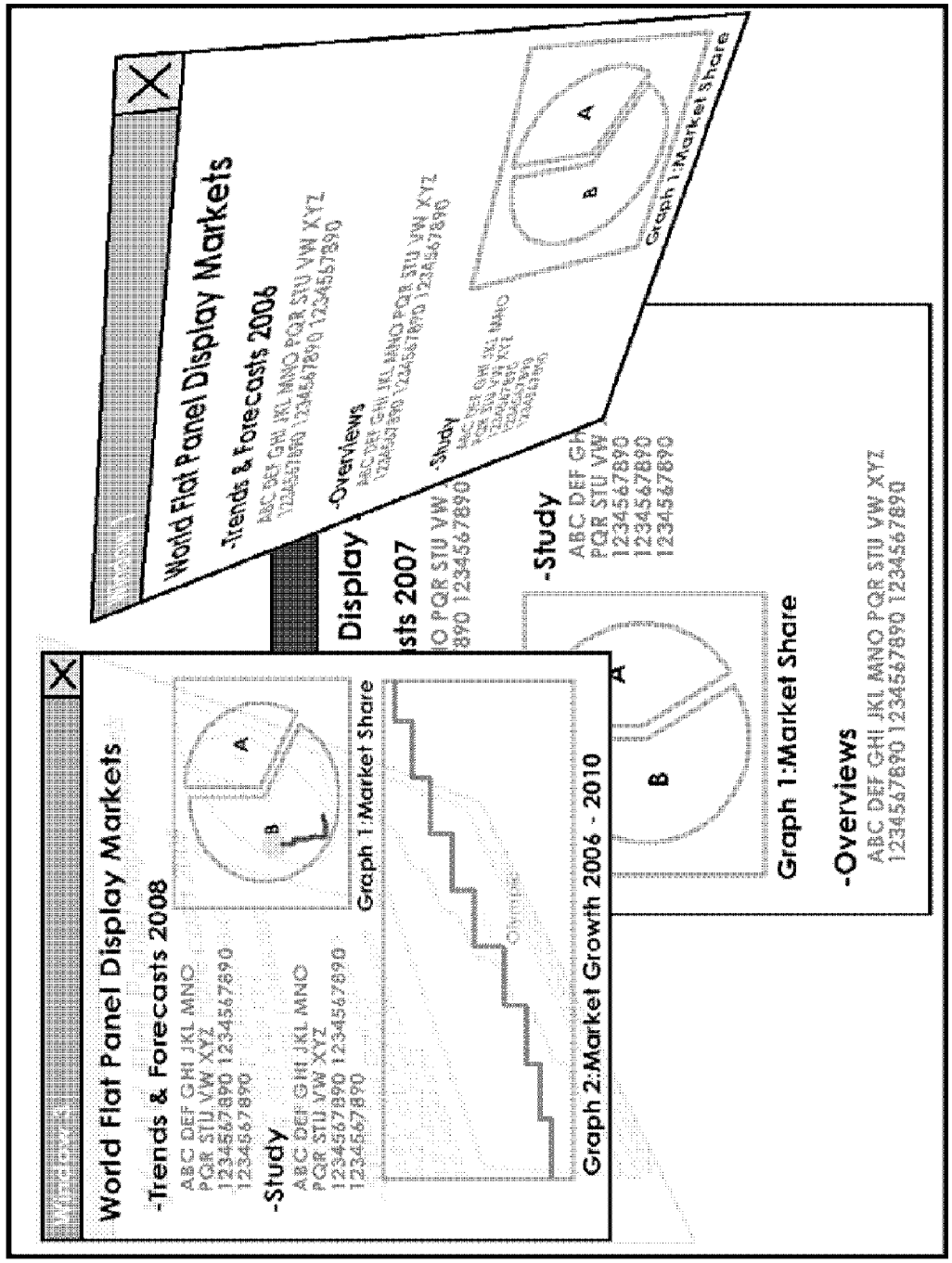
FIG. 24 shows an example of a display screen when the display of windows on which an annotation operation is to be performed has been changed from a three-dimensional display to a two-dimensional display in the PC according to the fifth embodiment of the present invention.

Next, in step S303, on the basis of the two-dimensional display coordinates of the window "Window 3", which have been calculated in step S302, the data controller 112, via the output unit 114, causes the display of the window "Window 3" to be rotated about the annotation input start coordinates. As a result, the display is changed from the three-dimensional display to a two-dimensional display (see FIG. 24). FIG. 24 show an example of a display screen when the display of windows on which the annotation operation is to be performed has been changed from the three-dimensional display to a two-dimensional display. The data controller 112 stores the three-dimensional display coordinates of the window "Window 3" in the HDD 107 via the data storage unit 113. Furthermore, the data controller 112, via the output unit 114, causes the result of the annotation input by the user to be reflected in the window displayed in a two-dimensional manner.

Figure 25:
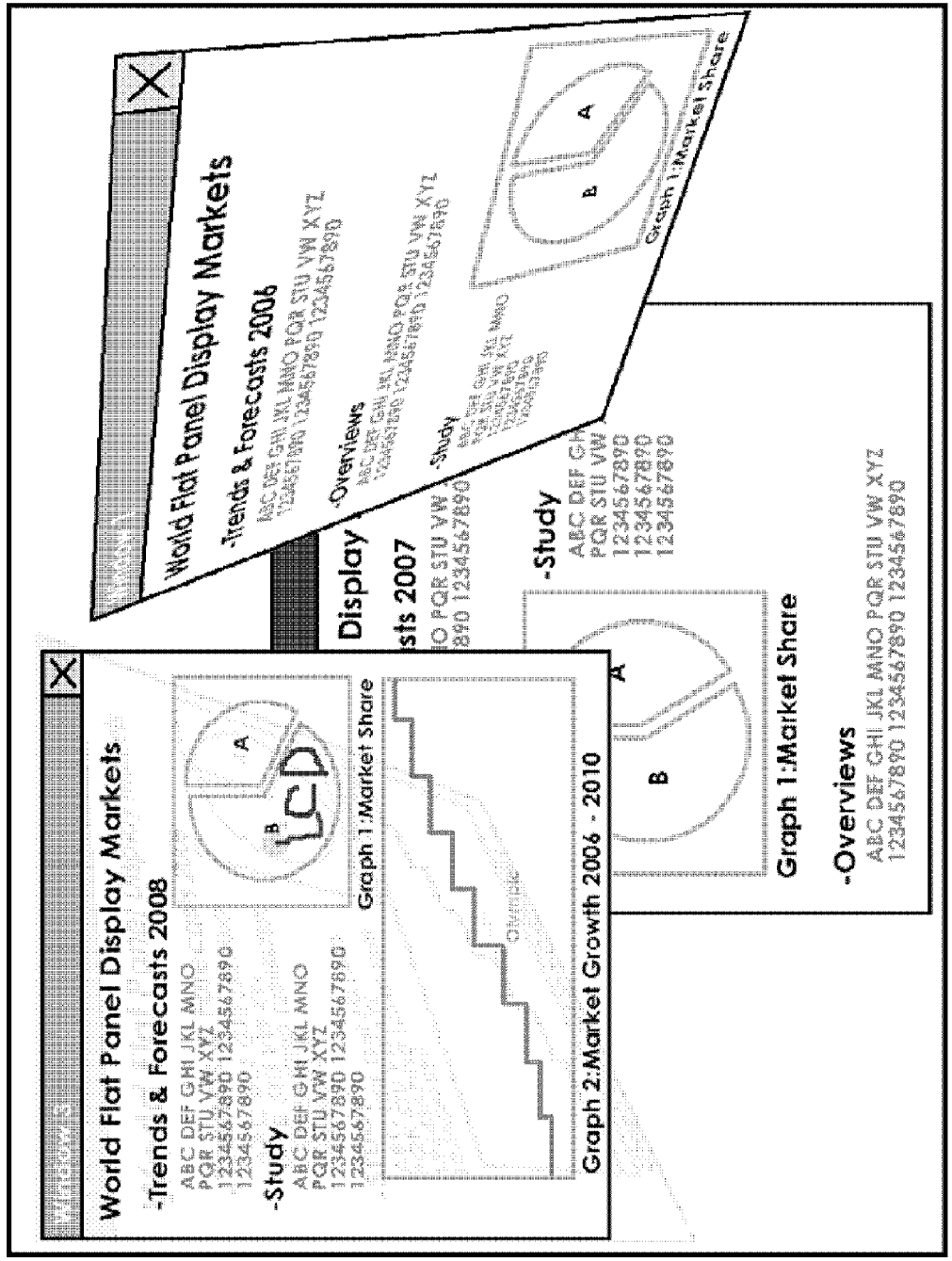
FIG. 25 shows an example of a display screen at the time of step S304 in the PC according to the fifth embodiment of the present invention.

Next, in step S304, the data controller 112 detects that the user has ended the annotation input to the window "Window 3" on the display screen via the input unit 115. FIG. 25 shows an example of a display screen at the time of step S304.

Figure 26:
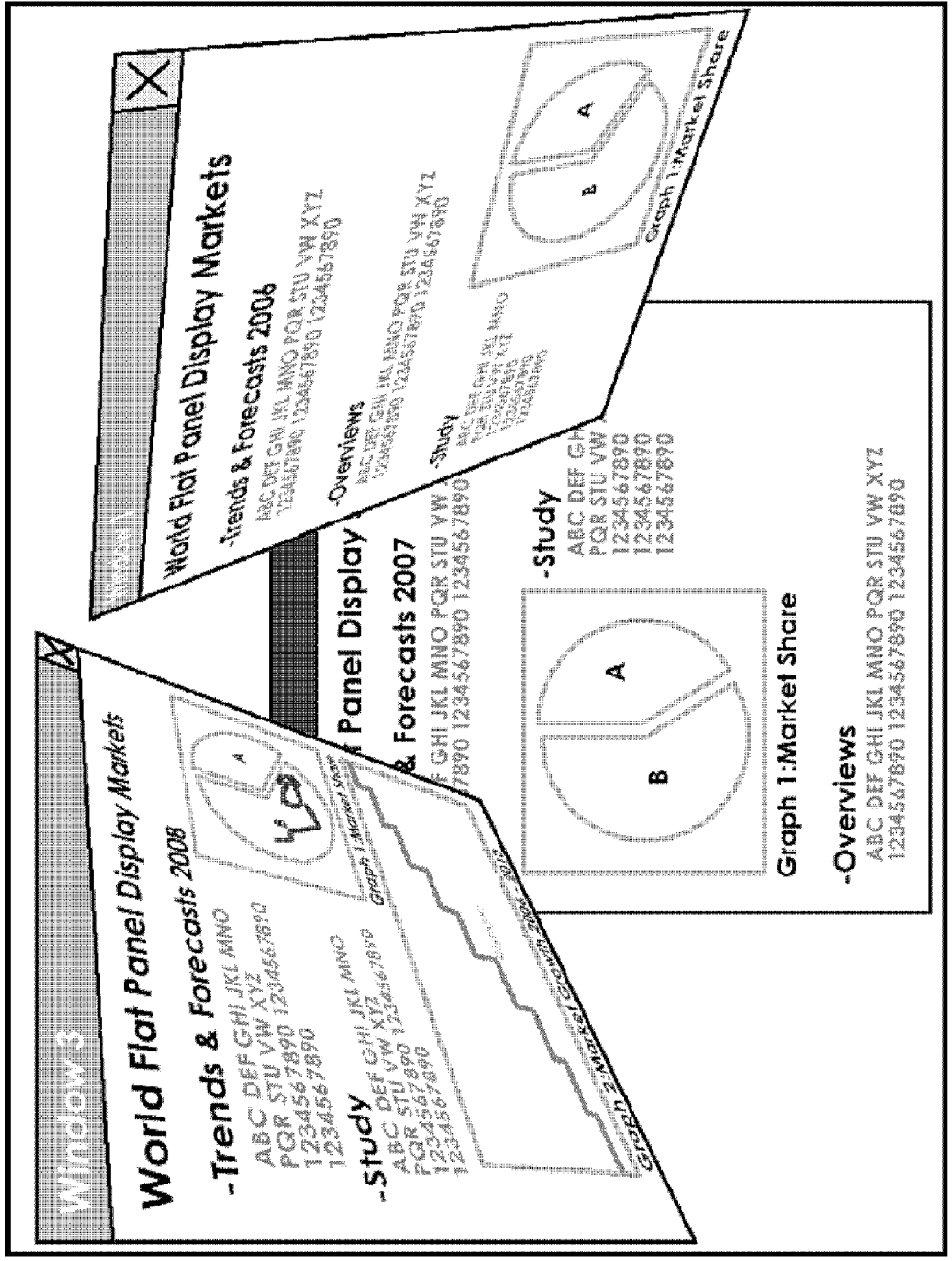
FIG. 26 shows an example of a display screen when the flowchart shown in FIG. 7 ends in the PC according to the fifth embodiment of the present invention.

Next, in step S305, on the basis of the three-dimensional display coordinates of the window "Window 3" stored in the HDD 107, the data controller 112, via the output unit 114, causes the display of the window "Window 3" to be rotated about the annotation input start coordinates. As a result, the "Window 3" is returned from the two-dimensional display to the three-dimensional display. Furthermore, the data controller 112, via the output unit 114, causes the display of the annotation to be rotated about the annotation input start coordinates in synchronization with the changing from the three-dimensional display of the window "Window 3" to the two-dimensional display. As a result, the annotation is changed from the two-dimensional display to the three-dimensional display (the content of the annotation, which is the result of the annotation operation) (see FIG. 26). FIG. 26 shows an example of a display screen when the flowchart shown in FIG. 7 ends. Then, after step S305, the data controller 112 ends the processing shown in FIG. 7.

In the manner described above, according to the fifth embodiment of the present invention, in contrast with the above-described first to fourth embodiments, when the display of a window is to be changed from a three-dimensional display to a two-dimensional display, the window is rotated about the annotation input start coordinates on the window plane.

In the manner described above, according to the fifth embodiment of the present invention, in the same manner as in the first to fourth embodiments, the coordinates at which the annotation input has started become the same on the two-dimensional display screen between the three-dimensional display and the two-dimensional display of a window. Therefore, it is possible for the user to perform an annotation operation without feeling annoyance. That is, the position at which annotation is begun to be written to a window in a three-dimensional state does not offset from the position of the input device 104 (for example, a pen) when a two-dimensional window is formed.

Furthermore, according to the fifth embodiment of the present invention, in the same manner as in the first to fourth embodiments, an operation for changing a three-dimensional display to a two-dimensional display does not need to be performed when the user performs an annotation operation.

Other Embodiments

Furthermore, the objects of the present invention may also be achieved by supplying a storage medium (or a recording medium), on which a software program code implementing the functions of any of the embodiments described above is stored, to a system or an apparatus whereby a central processing unit (CPU or MPU) in the system or apparatus reads and executes the program code stored on the storage medium. In this case, it should be understood that the program code read from the storage medium implements the functions of the above-described embodiments and thus the storage medium storing the program code falls within the scope of the present invention.

The features of the above-described embodiments may be implemented in such a manner that the central processing unit of the system or apparatus executes the read program code, and on the basis of instructions of the program code, an operating system (OS) running on the system or apparatus executes part or entirety of the actual processing.

The program code read from the storage medium may be written into a memory included in a function expansion card installed in the system or apparatus or in a function expansion unit connected to the system or apparatus, and a CPU or the like of the function expansion card or the function expansion unit may perform part or entirety of the actual processing on the basis of instructions of the program code, thereby implementing the features of the foregoing embodiments.

When the present invention is applied to the storage medium, program code corresponding to processes defined in the flowcharts is stored on the storage medium.

In the above-described embodiments, as examples of the input device 104, a keyboard, a mouse, a pen, an optical digitizer, and the like are described. In addition, an input unit (input device) other than the above may be used. The above-described embodiments may be combined as desired and carried out.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-098639 filed Apr. 4, 2007 which is hereby incorporated by reference herein in its entirety.

What is claimed is:

1. An information processing apparatus for displaying a window within a depth of a three dimensional graphical user interface such that the window is rotated at an angle from a plane of a display screen of a display device, the information processing apparatus comprising:

a display unit configured to display the window within the depth of a three dimensional graphical user interface such that the window is rotated an angle from the plane of the display screen; and a detection unit configured to detect a starting of an input operation with respect to a window displayed on the display screen, wherein, when the detection unit detects a starting of an annotation input on the window displayed within the depth of a three dimensional graphical user interface and rotated at a nonzero angle from the plane of a display screen, the display unit displays the window in a plane parallel to the display screen by rotating the window about a rotational axis intersecting an origin at which the annotation input has started on the window until the window is parallel to the display screen, wherein a result of the annotation input is reflected in the window displayed in the plane parallel to the display screen, wherein the detection unit is further configured to detect a completion of an input operation with respect to a window displayed on the display screen, and wherein, after the window is rotated about a rotational axis intersecting the origin at which the annotation input has started on the window so as to display the window in the plane parallel to the display screen and when a completion of the annotation input on the window is detected, the display unit rotates the window and the content of the annotation that is the result of the annotation input at the nonzero angle about the rotational axis in such a manner that the window with the annotation is once again displayed within the depth of the three dimensional graphical user interface such that the window is rotated at a nonzero angle from the plane of the display screen.

2. The information processing apparatus according to claim 1, wherein, when a display size of a window to be displayed in a plane parallel to the display screen is smaller than a predetermined fraction of an original display size of the window, the display unit expands the window to be displayed in a plane parallel to the display screen about coordinates of the origin at which the annotation input has started and displays the window.

3. The information processing apparatus according to claim 1, wherein, when a window is to be displayed in a plane parallel to the display screen would conceal an area of another window when displayed, the display unit displays the area concealed by the window displayed in a plane parallel to the display screen in a transparent manner.

4. The information processing apparatus according to claim 1, wherein, when a window is to be displayed in a plane parallel to the display screen would conceal an area of another window when displayed, the display unit moves the another window to a position at which the another window is not concealed by the window to be displayed in a plane parallel to the display screen.

5. A method for an information processing apparatus for displaying a window within a depth of a three dimensional graphical user interface such that the window is rotated at an angle from a plane of a display screen of a display device, the method comprising:

displaying the window within the depth of a three dimensional graphical user interface such that the window is rotated an angle from the plane of the display screen; and detecting a starting of an input operation with respect to a window displayed on the display screen, wherein, when a starting of an annotation input is detected on the window displayed within the depth of a three dimensional graphical user interface and rotated at a nonzero angle from the plane of a display screen, the window is displayed in a plane parallel to the display screen by rotating the window about a rotational axis intersecting an origin at which the annotation input has started on the window until the window is parallel to the display screen, wherein a result of the annotation input is reflected in the window displayed in the plane parallel to the display screen, wherein detecting further includes detecting a completion of an input operation with respect to a window displayed on the display screen, and wherein, after the window is rotated about a rotational axis intersecting the origin at which the annotation input has started on the window so as to display the window in the plane parallel to the display screen and when a completion of the annotation input on the window is detected, the window and the content of the annotation that is the result of the annotation input at the nonzero angle are rotated about the rotational axis in such a manner that the window with the annotation is once again displayed within the depth of the three dimensional graphical user interface such that the window is rotated at a nonzero angle from the plane of the display screen.

6. The method according to claim 5, wherein, when a display size of a window to be displayed in a plane parallel to the display screen is smaller than a predetermined fraction of an original display size of the window, the window to be displayed in a plane parallel to the display screen is expanded about coordinates of the origin at which the annotation input has started and displays the window.

7. The method according to claim 5, wherein, when a window is to be displayed in a plane parallel to the display screen would conceal an area of another window when displayed, the area concealed by the window displayed in a plane parallel to the display screen is displayed in a transparent manner.

8. The method according to claim 5, wherein, when a window is to be displayed in a plane parallel to the display screen would conceal an area of another window when displayed, the another window is moved to a position at which the another window is not concealed by the window to be displayed in a plane parallel to the display screen.

9. A non-transitory computer-readable storage medium storing instructions which, when executed by an apparatus for displaying a window within a depth of a three dimensional graphical user interface such that the window is rotated at an angle from a plane of a display screen of a display device, cause the apparatus to perform operations comprising:

displaying the window within the depth of a three dimensional graphical user interface such that the window is rotated an angle from the plane of the display screen; and detecting a starting of an input operation with respect to a window displayed on the display screen, wherein, when a starting of an annotation input is detected on the window displayed within the depth of a three dimensional graphical user interface and rotated at a nonzero angle from the plane of a display screen, the window is displayed in a plane parallel to the display screen by rotating the window about a rotational axis intersecting an origin at which the annotation input has started on the window until the window is parallel to the display screen, wherein a result of the annotation input is reflected in the window displayed in the plane parallel to the display screen, wherein detecting further includes detecting a completion of an input operation with respect to a window displayed on the display screen, and wherein, after the window is rotated about a rotational axis intersecting the origin at which the annotation input has started on the window so as to display the window in the plane parallel to the display screen and when a completion of the annotation input on the window is detected, the window and the content of the annotation that is the result of the annotation input at the nonzero angle are rotated about the rotational axis in such a manner that the window with the annotation is once again displayed within the depth of the three dimensional graphical user interface such that the window is rotated at a nonzero angle from the plane of the display screen.

* * * * *